United States Patent
Lu et al.

(10) Patent No.: US 12,276,312 B2
(45) Date of Patent: *Apr. 15, 2025

(54) MAGNETIC YOKE IRON CORE AND BRAKE

(71) Applicant: ALTRA INDUSTRIAL MOTION (SHENZHEN) CO., LTD., Shenzhen (CN)

(72) Inventors: Cha Lu, Shenzhen (CN); Kongjian Wu, Shenzhen (CN); Atkesone Bernard, Shenzhen (CN)

(73) Assignee: Altra Industrial Motion (Shenzhen) Co., Ltd., Shenzhen (CN)

( * ) Notice: Subject to any disclaimer, the term of this patent is extended or adjusted under 35 U.S.C. 154(b) by 410 days.

This patent is subject to a terminal disclaimer.

(21) Appl. No.: 17/889,155

(22) Filed: Aug. 16, 2022

(65) Prior Publication Data

US 2023/0086043 A1    Mar. 23, 2023

Related U.S. Application Data

(63) Continuation of application No. PCT/CN2022/076703, filed on Feb. 17, 2022.

(30) Foreign Application Priority Data

Sep. 18, 2021    (CN) .......................... 202111113421.1
Sep. 18, 2021    (CN) .......................... 202122283006.2
Sep. 18, 2021    (CN) .......................... 202122285097.3

(51) Int. Cl.
     *B60T 13/04*      (2006.01)
     *F16D 55/224*      (2006.01)
     (Continued)

(52) U.S. Cl.
     CPC .......... *F16D 65/18* (2013.01); *F16D 55/224* (2013.01); *F16D 65/123* (2013.01);
     (Continued)

(58) Field of Classification Search
     CPC ...... F16D 55/224; F16D 59/02; F16D 65/123; F16D 65/18; F16D 2121/20; F16D 2125/582; H02K 7/1023
     See application file for complete search history.

(56) References Cited

U.S. PATENT DOCUMENTS 4,892,175 A      1/1990    Van Erden et al.
5,154,261 A *    10/1992    Tanaka ..................... B66D 5/30
     188/161

(Continued)

FOREIGN PATENT DOCUMENTS

CN      206361052 U      7/2017
CN      209536856 U      10/2019

(Continued)

OTHER PUBLICATIONS

Machine translation of JP-08219194 (no date).*

*Primary Examiner* — Nicholas J Lane
(74) *Attorney, Agent, or Firm* — AP3 Law Firm PLLC

(57) ABSTRACT

The disclosure provides a magnetic yoke iron core and a brake including a magnetic yoke iron core, a first movable plate, a plurality of friction disks, at least one second movable plate, a coil, an armature and an elastic part; the first movable plate is located in a first mounting space and close to a first shaft end; a plurality of friction disks are sequentially arranged in the first mounting space along an axial direction of the magnetic yoke iron core and located at a side of the first movable plate close to a second shaft end; the coil is arranged in a second mounting space; the armature is connected with the first movable plate through a connector; the second movable plate is connected with the connec- (Continued)

tor; and the elastic part having a pre-tightening force which enables the armature to be far away from the magnetic yoke iron core.

12 Claims, 19 Drawing Sheets

(51) Int. Cl.
 *F16D 65/12* (2006.01)
 *F16D 65/18* (2006.01)
 *F16D 121/20* (2012.01)
 *F16D 125/58* (2012.01)
 *H02K 7/102* (2006.01)
(52) U.S. Cl.
 CPC ........ *F16D 65/125* (2013.01); *F16D 2121/20* (2013.01); *F16D 2125/582* (2013.01); *H02K 7/1023* (2013.01)

(56) References Cited

U.S. PATENT DOCUMENTS

| | | | | |
|---|---|---|---|---|
| 5,699,883 A | * | 12/1997 | Albrecht | ............... B60T 13/743 |
| | | | | 188/158 |
| 8,151,950 B2 | * | 4/2012 | Fargo | ....................... B66D 5/30 |
| | | | | 188/164 |
| 12,078,218 B2 | * | 9/2024 | Korhonen | .................. B66B 5/16 |
| 2017/0146079 A1 | * | 5/2017 | Kanayama | .............. F16D 55/30 |
| 2020/0391716 A1 | * | 12/2020 | Fiumano | .................. F16D 55/38 |
| 2022/0243775 A1 | * | 8/2022 | Skorski | ................... B66C 17/00 |

FOREIGN PATENT DOCUMENTS

| | | |
|---|---|---|
| CN | 110873135 A | 3/2020 |
| CN | 210366787 U | 4/2020 |
| CN | 112178077 A | 1/2021 |
| DE | 3605586 A1 | 8/1987 |
| JP | S57206248 A | 12/1982 |
| JP | H01188728 A | 7/1989 |
| JP | 08219194 A * | 8/1996 |

\* cited by examiner

MAGNETIC YOKE IRON CORE AND BRAKE

CROSS-REFERENCE TO RELATED APPLICATIONS

This application is a continuation of International Application No. PCT/CN2022/076703, filed on Feb. 17, 2022, which claims priority to Chinese Patent Application No. 202111113421.1, No. 202122283006.2 and No. 202122285097.3, filed on Sep. 18, 2021. The disclosures of the aforementioned applications are hereby incorporated by reference in their entireties.

TECHNICAL FIELD

The present application relates to the technical field of brake, in particular to a magnetic yoke iron core and a brake.

BACKGROUND

Electromagnetic brake is a widely used device. The traditional electromagnetic brake adopts the stacking assembly method, that is, the main components of the electromagnetic brake, including a magnetic yoke, an armature, a friction disk and a tail plate and so on, are stacked along the axial direction of the braked shaft. This assembly method leads to the large axial thickness of the traditional electromagnetic brake. However, with the emergence of some adverse factors (for example, the installation space becomes smaller), users have higher and higher expectations for thinning the thickness of the electromagnetic brake. Especially in some special applications, the use environment requires that the thickness of the electromagnetic brake must be very small, while the traditional electromagnetic brake cannot be used because of its large thickness.

FIG. 20 is a structural diagram of an electromagnetic brake in the prior art. The brake includes a magnetic yoke 91, an armature 94, a friction disk 96 and a tail plate 95, which are stacked in turn along the axis X direction of the braked shaft. The working principle of the electromagnetic brake shown in FIG. 20 is as follows:

The braked shaft is connected with the friction disk 96 through a shaft sleeve 97, and the friction disk 96 rotates coaxially with the braked shaft. When the friction disk 96 is clamped by the armature 94 and the tail plate 95, the friction disk 96 rubs against the armature 94 and the tail plate 95 to generate a braking force. Under the action of the braking force, the braked shaft stops rotating together with the friction disk 96 to realize braking. When the friction disk 96 is released (that is, the friction disk 96 is not clamped by the armature 94 and the tail plate 95), the friction disk 96 will not rub against the armature 94 and the tail plate 95, and no braking force will be generated. When there is no braking force, the braked shaft can rotate freely.

The tail plate 95 is connected to the magnetic yoke 91 through a threaded connector 98 and a sleeve 99 and remains relatively fixed. The armature 94 can move axially, thereby changing the distance M between the tail plate 95 and the armature 94. When the distance M increases, the friction disk 96 is released and the braked shaft can rotate freely. When the distance M decreases, the friction disk 96 is clamped to realize braking. The armature 94 moves axially through a coil 92 and a spring 93. When the coil 92 is not energized, the spring 93 pushes the armature 94 close to the tail plate 95, the distance M decreases, and the friction disk 96 is clamped. When the coil 92 is energized, a magnetic force is generated. Under the attraction of the magnetic force, the armature 94 overcomes the elastic force of the spring 93, approaches the magnetic yoke 91 and away from the tail plate 95, the distance M increases, and the friction disk 96 is released.

It can be clearly seen from FIG. 20 that the magnetic yoke 91, the armature 94, the friction disk 96 and the tail plate 95 are stacked in turn in the axis X direction. The thickness of the magnetic yoke 91, the armature 94, the friction disk 96 and the tail plate 95 form part of the overall thickness of the electromagnetic brake, and the overall thickness of the electromagnetic brake is large.

In order to reduce the overall thickness of the electromagnetic brake, the traditional practice is to reduce the thickness of the magnetic yoke 91, the armature 94, the friction disk 96 and the tail plate 95 as much as possible by using better materials and more refined processing technology. Although the overall thickness of the electromagnetic brake can be reduced and the problem of excessive thickness of the electromagnetic brake solved to a certain extent, but the following new problems will be caused:

(1) After the magnetic yoke 91 becomes thinner, the space containing the coil 92 becomes smaller, resulting in a reduction in the volume of the coil 92. After the volume of coil 92 decreases, the magnetic field decreases and the heating power of coil 92 increases.

(2) After the friction pair parts (i.e., the armature 94, the friction disk 96 and the tail plate 95) become thinner (the diameter thickness ratio increases), at least the following four problems will occur. Firstly, the rigidity of the parts is weakened, and the parts are prone to creep or stress deformation. Secondly, the materials of parts become less, the heat capacity decreases, the temperature of parts rises rapidly in the process of friction, and the braking torque attenuation is easy to occur. Rapid temperature rise of parts will also lead to thermal stress and deformation. In serious cases, the parts may be completely damaged and the brake may be scrapped. Thirdly, the extremely thin friction pair parts will amplify the noise (similar to the function of horn diaphragm) or make the noise sharper during friction. Fourthly, after the thickness of friction disk 96 is reduced, the structural strength is insufficient and the processing difficulty increases. The perpendicularity between the middle hole of the friction disk 96 and the friction surface becomes worse. Moreover, the fitting length between the middle hole of the friction disk 96 and the braked shaft or shaft sleeve 97 becomes smaller. The friction disk 96 is prone to oscillate during rotation, making abnormal noise and increasing the drag torque. When rotating at high speed, the friction surface of the friction disk 96 is easy to be locally ablated, so as to reduce the friction torque and affect the braking effect.

SUMMARY

These and other problems are generally solved or circumvented, and technical advantages are generally achieved, by embodiments of the present application which provide a magnetic yoke iron core and a brake.

Technical Problems

The present application provides a magnetic yoke iron core and a brake, which aims to solve the problem of large thickness of the brake and reduce the thickness of the brake without causing new problems.

Technical Solutions

In order to solve the above problems, the application provides a magnetic yoke iron core for forming a brake, the magnetic yoke iron core includes an iron core body; the iron core body includes a first mounting space and a second mounting space distributed sequentially and concentrically from inside to outside of the iron core body, and the iron core body has a first shaft end and a second shaft end opposite to each other; the first mounting space penetrates through a center position of the iron core body in an axial direction of the iron core body, and the first mounting space is configured for mounting at least one friction disk and at least one movable plate corresponding to the first shaft end; and an opening of the second mounting space faces the second shaft end, and the second mounting space is configured for mounting a coil.

On the other hand, the magnetic yoke iron core includes an iron core body with a preset thickness, the center line passing through the iron core body along the thickness direction of the iron core body coincides with the axis of the braked shaft. The iron core body is concentrically distributed with a first mounting space and a second mounting space from a center to an edge.

The first mounting space passes through the middle of the iron core body along the thickness direction, the first mounting space is used to completely accommodate a friction disk and a movable plate of the brake, so that the friction disk and the movable plate do not increase the overall thickness of the brake, and the friction disk and the movable plate are placed into the first mounting space from a first side of the iron core body; and the second mounting space has an opening, the opening faces a second side of the iron core body, the second side and the first side are different sides of the iron core body distributed along the thickness direction, and the second mounting space is used to accommodate the coil of the brake.

In order to solve the above problems, the application provides a brake including the above magnetic yoke iron core, the magnetic yoke iron core includes a first mounting space and a second mounting space distributed sequentially and concentrically from inside to outside of the magnetic yoke iron core; the first mounting space penetrates through a center position of the magnetic yoke iron core in an axial direction of the magnetic yoke iron core, and an opening of the second mounting space faces a second shaft end of the magnetic yoke iron core.

The brake further includes a first movable plate, at least one second movable plate, a plurality of friction disks, a coil, an armature and an elastic part.

The first movable plate is located in the first mounting space and close to a first shaft end of the magnetic yoke iron core; the first shaft end is an opposite end of the second shaft end; the plurality of friction disks are sequentially arranged in the first mounting space along the axial direction of the magnetic yoke iron core and located at a side of the first movable plate close to the second shaft end; each second movable plate is arranged between two adjacent friction disks; the coil is arranged in the second mounting space; the armature is located at the second shaft end of the magnetic yoke iron core, the armature is connected with the first movable plate through a connector, the connector passes through the magnetic yoke iron core and is slidably matched with the magnetic yoke iron core, and the second movable plate is connected with the connector; and the elastic part is arranged between the armature and the magnetic yoke iron core, and the elastic part has a pre-tightening force that enables the armature to be far away from the magnetic yoke iron core.

On the other hand, the brake includes the above magnetic yoke iron core, which includes an iron core body with a preset thickness, the center line passing through the iron core body along the thickness direction of the iron core body coincides with the axis of the braked shaft. The iron core body is concentrically distributed with a first mounting space and a second mounting space from a center to an edge. The first mounting space passes through the middle of the iron core body along the thickness direction, the second mounting space has an opening, the opening faces a second side of the iron core body, and the second side and the first side are different sides of the iron core body distributed along the thickness direction.

The brake further includes at least two movable plates, a plurality of friction disks, a coil, an armature and an elastic part.

The plurality of friction disks and the at least two movable plates are located in the first mounting space, so that the overall thickness of the brake is not increased. The armature is located on the second side of the iron core body, and the armature and the movable plates are connected with each other through a connector. The connector passes through the iron core body along the thickness direction and slides with the iron core body. The armature can drive the movable plates to move along the thickness direction, so that the movable plates can compress or loosen the friction disk. The elastic part is installed on the iron core body, and the elastic part acts on the armature and has an elastic force to move the armature to the second side.

In the braking state, the coil is not energized, the armature is acted by the elastic force to drive the movable plates to move to the second side, and the movable plates compress the friction disks and prevents the friction disks from rotating.

In the non-braking state, the coil is energized, and the armature is driven by magnetic force to overcome the elastic force and drive the movable plates to move to the first side, so that the movable plates are separated from the friction disks and the rotation of the friction disks is relieved.

Advantageous Effects of the Disclosure

Compared with the prior art, the magnetic yoke iron core provided by the present application, where the magnetic yoke iron core has a first mounting space capable of accommodating parts such as the friction disk and the movable plate. After the brake is assembled, the friction disks and the movable plates are located in the first mounting space without increasing the overall thickness of the brake, so as to solve the problem of large thickness of the existing brake and realize the purpose of reducing the thickness of the brake.

Compared with the prior art, the brake provided by the present application not only has the required braking capacity, but also improves the layout of parts. The magnetic yoke iron core has a first mounting space. The friction disks and the movable plates are located in the first mounting space, rather than stacking in the thickness direction of the brake, so as to achieve the purpose of reducing the thickness of the brake.

BRIEF DESCRIPTION OF THE DRAWINGS

In order to more clearly illustrate the technical solutions in the embodiments of the present application, the drawings used in the embodiments or the prior art description will be briefly described below, and it is obvious that the drawings in the following description are only some embodiments of the present application, and that other drawings can be obtained from these drawings without involving any inventive effort for a person skilled in the art.

Figure 1:
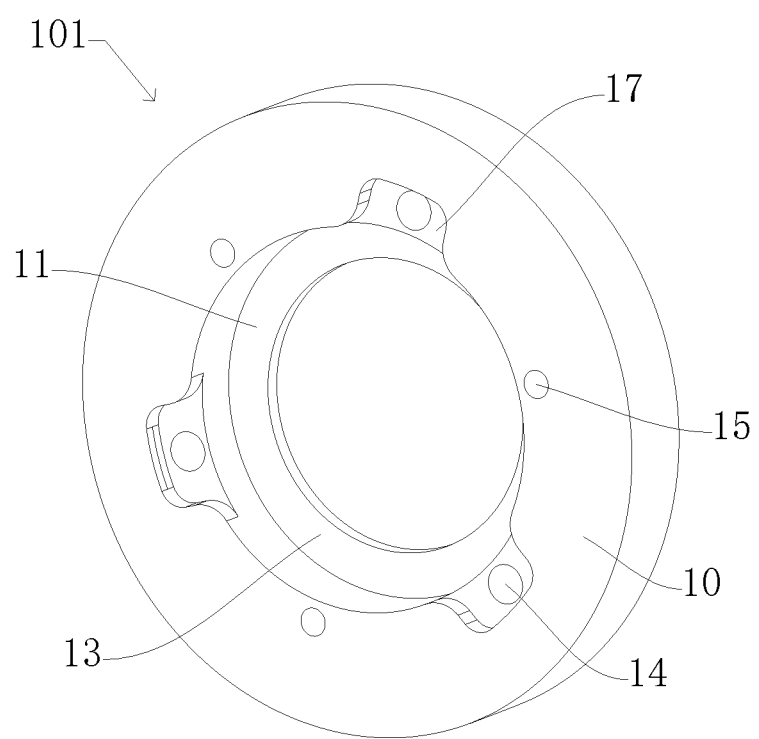
FIG. 1 is a schematic three-dimensional structural diagram of the magnetic yoke iron core provided by one embodiment of the present application.

10—iron core body; 11—first mounting space; 12—second mounting space; 121—wiring opening; 13—extending portion; 14—connecting hole; 15—mounting hole; 16—blind hole; 17—positioning slot; 18—third mounting space; 19—mounting area; 101—magnetic yoke iron core; 20—first movable plate; 21—locating block; 22—second movable plate; 23—clamping slot; 30—friction disk; 31—friction monomer; 311—first accommodating groove; 312—chute; 313—second accommodating groove; 314—boss; 32—elastic component; 321—first tension spring; 322—second tension spring; 323—guide post; 324—fixed frame; 33—central space; 40—coil; 50—armature; 60—elastic part; 70—shaft sleeve; 80—connector; 81—connecting part; 82—guide pole; 83—guide slot.

DETAILED DESCRIPTION OF ILLUSTRATIVE EMBODIMENTS

In order to make the technical problems, technical solutions and beneficial effects clearer, the application is further described in detail below in combination with the attached drawings and embodiments. It should be understood that the specific embodiments described herein are only used to explain the application and are not used to limit the application. "a plurality of" means two or more.

With reference to FIG. 1-FIG. 4, FIG. 10 and FIG. 19, the magnetic yoke iron core 101 provided by embodiments of this application is now described. Refer to FIG. 1-FIG. 20, the magnetic yoke iron core 101 includes an iron core body 10. The iron core body 10 distributes a first mounting space 11 and a second mounting space 12 sequentially and concentrically from inside to outside of the iron core body 10, the iron core body 10 has a first shaft end and a second shaft end opposite to each other. The first mounting space 11 penetrates through a center position of the iron core body 10 in an axial direction of the iron core body 10, the first mounting space 11 is configured to mount at least one friction disk 30 and at least one movable plate (20, 22) corresponding to the first shaft end; and an opening of the second mounting space 12 faces the second shaft end, the second mounting space 12 is configured for mounting a coil 40.

It should be noted that the axial direction of the iron core body 10 is the thickness direction of the iron core body 10. After the magnetic yoke iron core 101 forms the brake, the axis of the braked shaft penetrates through the center of the iron core body 10 along the thickness direction of the iron core body 10. That is, the center line which penetrates through the iron core body 10 along the thickness direction coincides with the axis of the braked shaft. The first shaft end is the first side of the iron core body 10, and the second shaft end is the second side of the iron core body 10. The first side and the second side are different sides of the iron core body 10 distributed along its own thickness direction. The second mounting space 12 may also be referred to as a second mounting groove. The magnetic yoke iron core 101 may also be referred to as a yoke, a housing, a magnetic conducting housing, a conducting magnet, a shell, or the like, and is a component of the brake. The magnetic yoke iron core 101 itself is not magnetic. Those skilled in the art can understand that when the coil 40 of the brake is energized, the magnetic yoke iron core 101 is magnetized to produce magnetism. While when the coil 40 is not energized, the magnetism of the magnetic yoke iron core 101 disappears.

Compared with the prior art, the magnetic yoke iron core provided in this application, when assembling and forming the brake, the friction disk 30, the movable plate (20, 22), the coil 40 and other parts are located in the first mounting space 11 and the second mounting space 12 inside the iron core body 10. The overall thickness of the brake is the sum of the thickness of the iron core body 10 and the thickness of the armature 50. The friction disk 30, the movable plate (20, 22), the coil 40 and other parts do not increase the overall thickness of the brake. The overall thickness of the brake is much smaller than the traditional stacked structure. Because the friction disk 30, the movable plate (20, 22) and the coil 40 do not increase the overall thickness of the brake, the thickness of the friction disk 30, the movable plate (20, 22) and the coil 40 does not need to be over reduced, which can ensure reasonable strength, lower material and processing costs, and ensure appropriate coil volume and power.

Using the magnetic yoke iron core provided by this application, the thickness of the friction disk 30 can be appropriately increased. This can not only improve the overall structural strength of the friction disk 30, facilitate processing, but also easily ensure the perpendicularity of the middle hole and the friction surface. The increase of the thickness of the friction disk 30 can also increase the mating area between the middle hole and the shaft sleeve 70 or shaft, and reduce the shaking and drag torque during the rotation of the friction disk 30, so it is especially suitable for occasions with high speed or high requirements for silence. The friction disk 30 and the movable plate (20, 22) are located in the first mounting space 11, when the brake works, they are surrounded by the iron core body 10 and the surrounding parts, and the outward propagation of the noise generated by the friction disk 30 friction is blocked, further reducing the noise.

Using the magnetic yoke iron core provided by this application, the friction disk 30 is located in the first mounting space 11, the diameter of the friction disk 30 is smaller than that of the traditional friction disk, the friction linear speed is lower at the same motor speed, the wear rate is lower, and the service life is longer. Moreover, when the diameter of the friction disk 30 is small, compared with the traditional brake, when the speed is the same, the outer ring linear speed of the friction disk 30 is smaller and the dust thrown out is less. Even if the friction disk 30 will throw out a small amount of dust, the thrown dust is also located in the first mounting space 11 and will not run to the outside, which is conducive to the cleanliness of the brake working environment, and can also prevent dust from entering the gap between the iron core body 10 and the armature 50.

Figure 2:
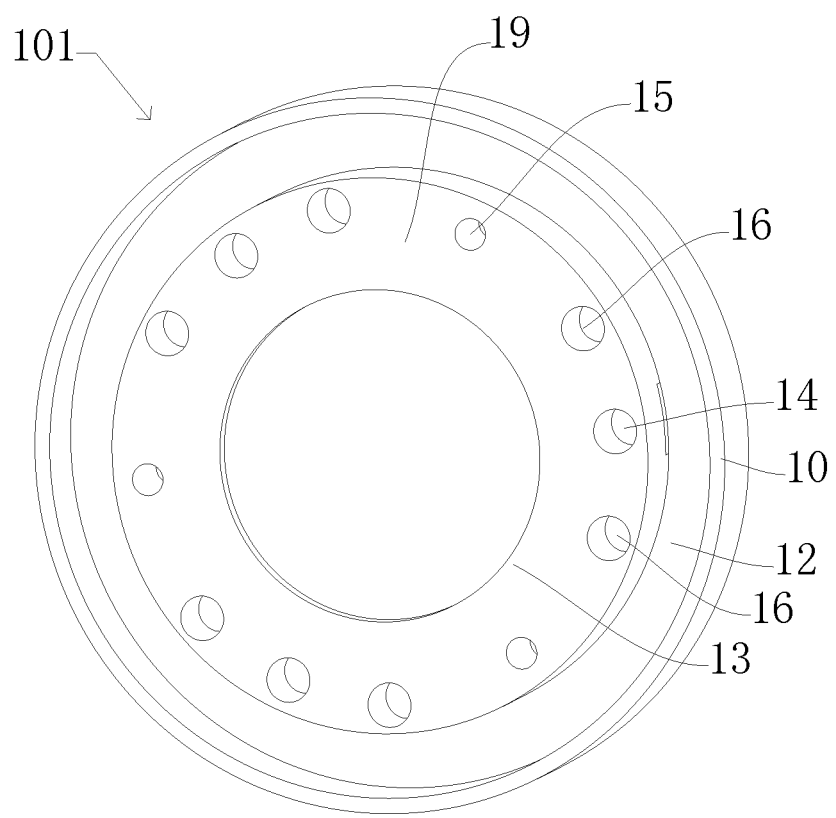
FIG. 2 is a schematic three-dimensional structural diagram of the magnetic yoke iron core provided by one embodiment of the present application.
Figure 4:
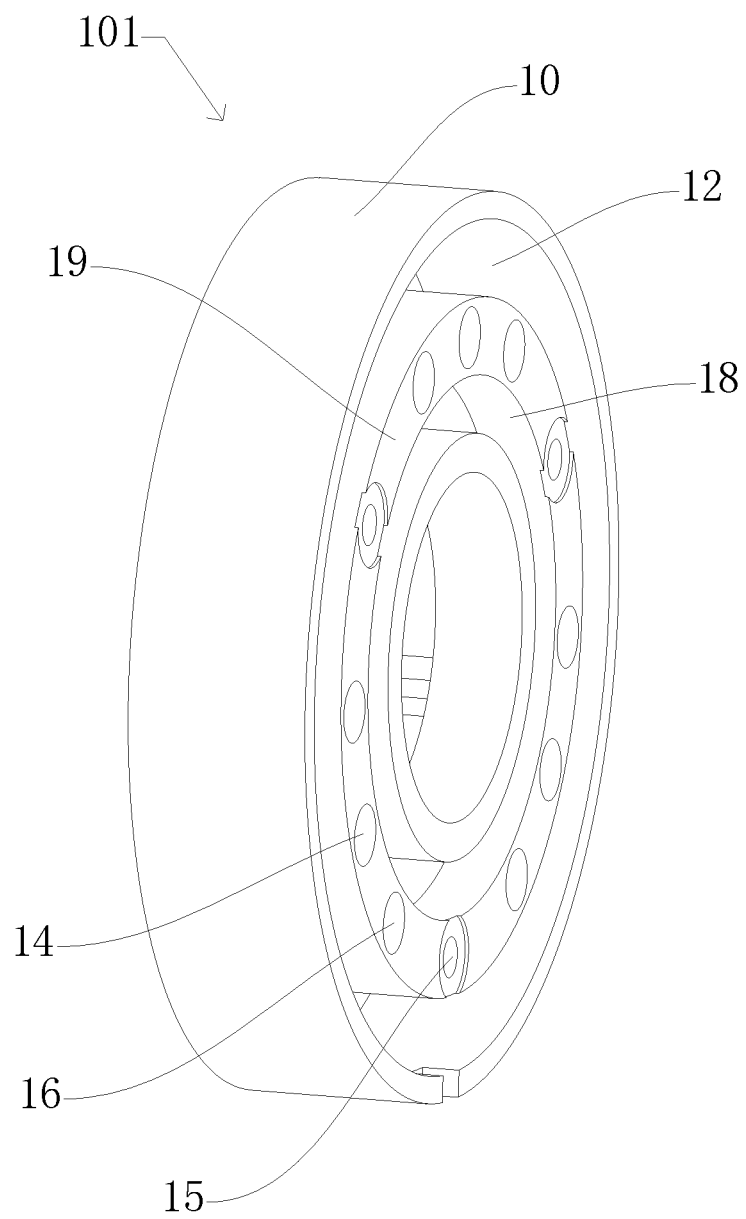
FIG. 4 is a schematic three-dimensional structural diagram of the magnetic yoke iron core provided by one embodiment of the present application.
Figure 5:
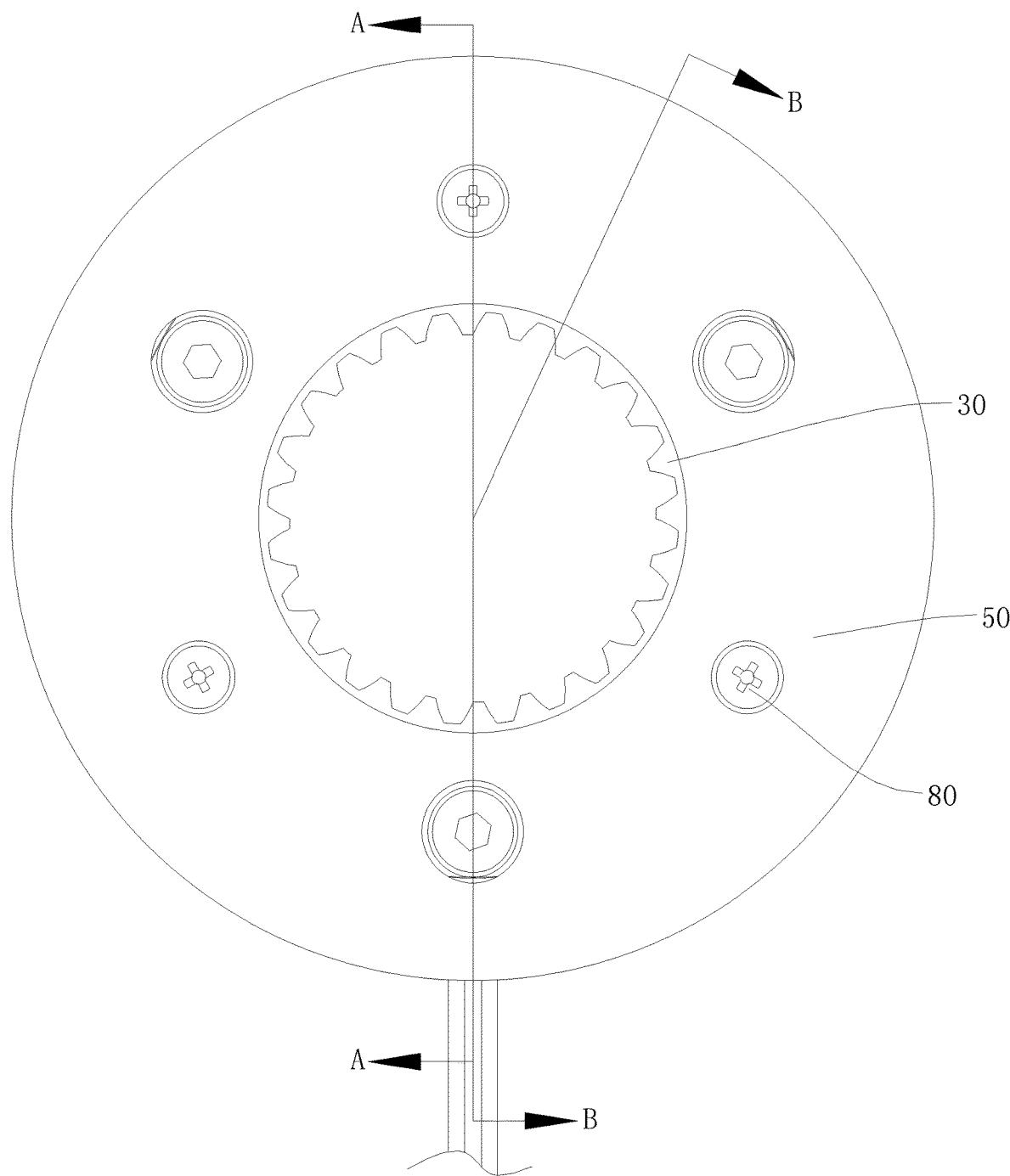
FIG. 5 is a schematic front structural diagram of the brake provided by one embodiment of the present application.

In some embodiments, an improved embodiment of the iron core body 10 may adopt the structure shown in FIG. 1, FIG. 2 and FIG. 4. Refer to FIG. 1, FIG. 2 and FIG. 4, an annular mounting area 19 for installing at least one connector 80 is formed on the iron core body 10, the annular mounting area 19 is between the first mounting space 11 and the second mounting space 12, and the annular mounting area 19 is provided with a plurality of connecting holes 14 uniformly distributed around an axis of the iron core body 10, each of the plurality of connecting holes 14 is configured for mounting a connector 80 connecting an armature 50 and at least one movable plate (20, 22). The connector 80 passes through the connecting hole 14 and can slide along the thickness direction of the iron core body 10 in the connecting hole 14. The number of connectors 80 is consistent with the number of connecting holes 14.

In some embodiments, an improved embodiment of the iron core body 10 may adopt the structure shown in FIG. 1-FIG. 4, FIG. 19. Refer to FIG. 1-FIG. 4, FIG. 19, the annular mounting area 19 is further provided with a plurality of mounting holes 15, each of the plurality of mounting holes 15 penetrates through the iron core body 10 in the axial direction of the iron core body 10 (i.e. the thickness direction of iron core body 10), and each of the plurality of mounting holes 15 is arranged alternately with each of the plurality of connecting holes 14. When installing the brake formed by the assembly of the iron core body 10 and other components, the user can insert a bolt into the mounting hole 15 and install the brake to an external object through the bolt, so that the brake can be used. Since the mounting hole 15 and the connectors are set alternately, the brake can be firmly installed, so it has good stability when in use.

As an alternative embodiment, the mounting hole 15 may not be set alternately with the connecting hole 14, but the alternative setting in this embodiment is more conducive to the stability of the brake when in use.

In other embodiments, the mounting hole 15 may not be in the mounting area 19. For example, the mounting hole 15 may be located in the outer ring of the iron core body 10. Alternatively, a portion extending outward in the radial direction may be arranged on the edge of the iron core body 10, and the mounting hole 15 may be arranged on the portion extending outward. The position of the mounting hole 15 is related to factors such as the installation environment of the brake. The technical scheme of modifying the position of the mounting hole 15 and the structure according to the installation environment and other factors is within the protection scope of this application.

In some embodiments, an improved embodiment of the iron core body 10 may adopt the structure shown in FIG. 2 and FIG. 4. Refer to FIG. 2 and FIG. 4, the annular mounting area 19 is further provided with a plurality of blind holes 16 having openings facing the second shaft end; on an annular path of a distribution of the plurality of connecting holes 14, and two sides of each of the plurality of connecting holes 14 are provided with at least one blind hole 16, which is configured for mounting at least one elastic part. A spring (i.e. an elastic part, hereinafter referred to as a spring) needs to be installed between the iron core body 10 and the armature 50, so that the armature 50 can drive the movable plate (20, 22) to squeeze the friction disk 30 when the power is cut off. If the blind hole 16 is not provided, the spring may be directly arranged between the armature 50 and the iron core body 10. However, in this case, the spring cannot be guided, and the selection specification of the spring will be limited. In this embodiment, when the blind hole 16 is set and the spring is in the blind hole 16, the inner wall of the blind hole 16 can play a certain guiding role when the spring expands and contracts, and the spring may choose a longer specification and have a longer service life.

For example, there is a connecting hole 14 between each two mounting holes 15, and there is a blind hole 16 on both sides of the connecting hole 14, and the blind holes 16 on both sides of the connecting hole 14 are also between the two mounting holes 15. The distribution of the mounting holes 15, the connecting holes 14 and the blind holes 16 may also adopt other forms. The distribution form of the hole structure in the mounting area 19 may be flexibly designed according to the application environment.

Figure 3:
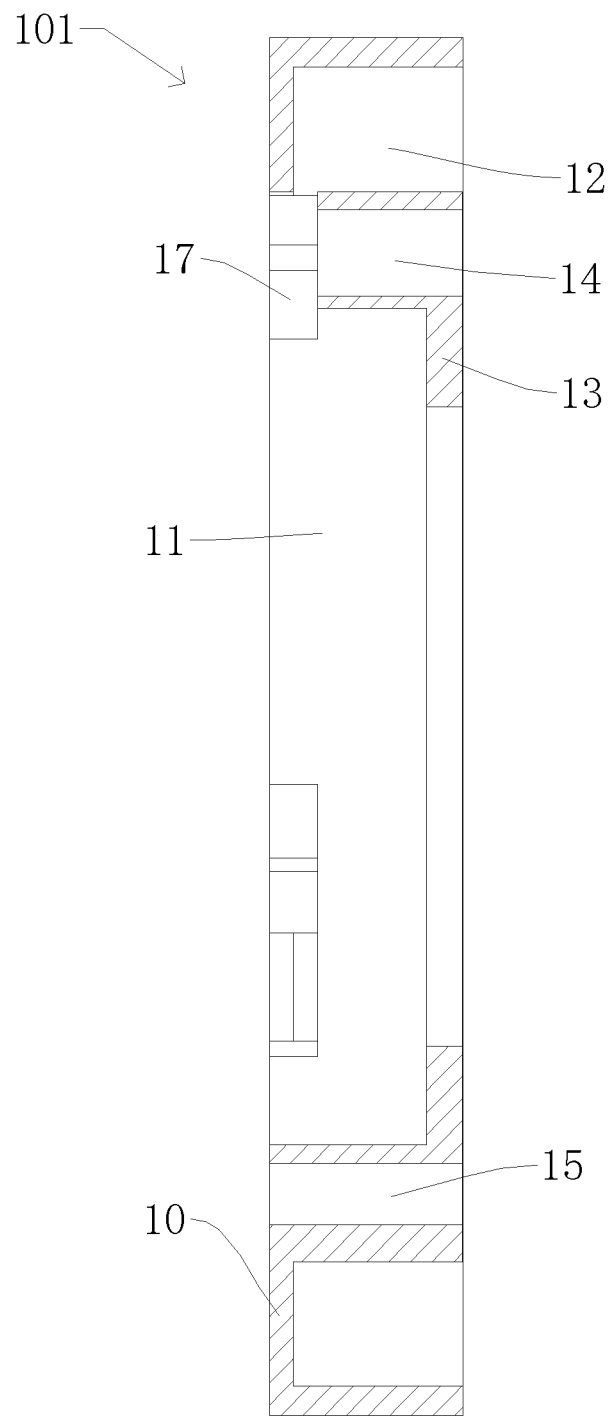
FIG. 3 is a schematic sectional structural diagram of the magnetic yoke iron core provided by one embodiment of the present application.

In some embodiments, an improved embodiment of the iron core body 10 may adopt the structure shown in FIG. 1 and FIG. 3. Refer to FIG. 1 and FIG. 3, a positioning slot 17 is formed on an end surface of the first shaft end of the iron core body 10, and the positioning slot 17 is connected with the first mounting space 11, and the positioning slot 17 is configured to position at least one movable plate (20, 22) of a brake. The outer circumference of the movable plate (20, 22) is provided with a locating block 21 corresponding to the positioning slot 17. When the movable plate (20, 22) is installed, the locating block 21 is in the positioning slot 17, which can play a role of limiting effect and facilitating installation.

The limiting effect means that the cooperation between the locating block 21 and the positioning slot 17 has a limiting effect. When installing the movable plate (20, 22), the operator does not need to spend attention, experience and professional knowledge, and can directly complete the correct operation without error, so as to facilitate the installation of the movable plate (20, 22).

It should be noted that since the first movable plate 20 needs to move along the axial direction of the iron core body 10 driven by the armature 50, the depth of the positioning slot 17 needs to be greater than the thickness of the locating block 21. One end of the connector 80 is connected with the armature 50, and the other end is connected with the locating block 21.

The design standard of the depth of the positioning slot 17 is mainly determined by the axial moving distance of the movable plate. The axial moving distance of the movable plate=the length of the guide pole–the thickness of the friction disk–the thickness of the extending portion. The depth of the positioning slot 17 cannot be less than the moving distance of the movable plate.

In some embodiments, an improved embodiment of the iron core body 10 may adopt the structure shown in FIG. 1 and FIG. 3. Refer to FIG. 1 and FIG. 3, the end surface of the first shaft end of the iron core body 10 forms a plurality of positioning slots 17, which are uniformly distributed around an axis of the iron core body 10 (i.e. the center line passing through the iron core body 10 along the thickness direction). The number of the positioning slots 17 is consistent with the number of the locating blocks 21 on the movable plate (20, 22). That is, a plurality of positioning slots 17 means that there are also multiple locating blocks 21. Optionally, the number of positioning slots 17 is three. With the increase of the number of positioning slots 17, the number of locating blocks 21 on the movable plate (20, 22) will increase accordingly, and the driving force generated by the armature will be better transmitted to the movable plate (20, 22), resulting in better braking effect.

In some embodiments, an improved embodiment of the iron core body 10 may adopt the structure shown in FIG. 4. Refer to FIG. 4, the iron core body 10 is further provided with at least one third mounting space 18 (or third mounting groove) coaxially arranged with the second mounting space 12, and an opening of the at least one third mounting space 18 faces the shaft end of the iron core body 10, and the at least one third mounting space 18 is configured for mounting an auxiliary coil. When the coil 40 in the second mounting space 12 and the auxiliary coil in the third mounting space 18 are installed at the same time, the braking torque can be increased. Compared with a single coil, it can achieve high torque under the same outer diameter size and power conditions, and it also cannot increase the overall thickness, which has great advantages over the traditional stacked structure.

It should be noted that the third mounting space 18 is coaxial with the second mounting space 12. The third mounting space 18 may be located between the first mounting space 11 and the second mounting space 12, in the outer ring area of the second mounting space 12, or in the inner ring area of the first mounting space 11. The second mounting space 12 and the third mounting space 18 may be provided with or without wiring opening 121. When the wiring opening 121 is set, the outgoing line of the coil located in the mounting space may extend out through the wiring opening 121 to connect the power supply or other components. When no wiring opening 121 is set, the outgoing line of the coil may extend out from the opening of the mounting space.

In some embodiments, an improved embodiment of the iron core body 10 may adopt the structure shown in FIG. 1-FIG. 3. Refer to FIG. 1-FIG. 3, an inner side surface of the first mounting space 11 close to the second shaft end is provided with an extending portion 13 extending towards an axis of the iron core body 10. The extending portion 13 extends from the inner wall to the center of the iron core body 10. After the brake is assembled, the extending portion 13 and the movable plate away from the second shaft end are located at both ends (i.e., both sides) of the friction disk 30 respectively. When the coil 40 is powered off, the armature 50 drives the movable plate close to the friction disk 30, and the two shaft end surfaces (i.e. the surfaces on both sides) of the friction disk 30 are compacted and rubbed with the movable plate and the extending portion 13 respectively to realize braking.

In some embodiments, the side of the extending portion 13 close to the axis of the iron core body 10 protrudes towards the second shaft end and is provided with an annular protrusion. The annular protrusion is surrounded by the inner wall of the iron core body 10 to form a third mounting space 18, which is compact in structure.

Based on the same inventive concept, the application also provides a brake with the magnetic yoke iron core 101.

With reference to FIG. 5-FIG. 18, the brake provided by embodiments of this application is now described. The brake includes a magnetic yoke iron core 101, a first movable plate 20, a plurality of friction disks 30, a coil 40, at least one second movable plate 22, an armature 50 and an elastic part 60. The magnetic yoke iron core 101 distributes a first mounting space 11 and a second mounting space 12 sequentially and concentrically from inside to outside of the magnetic yoke iron core 101; the first mounting space 11 penetrates through a center position of the magnetic yoke iron core 101 in an axial direction of the magnetic yoke iron core 101, and an opening of the second mounting space 12 faces a second shaft end of the magnetic yoke iron core 101. The first movable plate 20 is located in the first mounting space 11 and close to a first shaft end of the magnetic yoke iron core 101; the first shaft end is an opposite end of the second shaft end. The plurality of friction disks 30 sequentially arranged in the first mounting space 11 along the axial direction of the magnetic yoke iron core 101 and located at the side of the first movable plate 20 close to the second shaft end. Each second movable plate 22 is arranged between two adjacent friction disks 30. The coil 40 is arranged in the second mounting space 12. The armature 50 is located at the second shaft end of the magnetic yoke iron core 101; the armature 50 is connected with the first movable plate 20 through at least one connector 80; the at least one connector 80 passes through the magnetic yoke iron core 101 and is slidably matched with the magnetic yoke iron core 101, and the at least one second movable plate 22 is connected with the at least one connector 80; and the armature 50 is configured to drive the first movable plate 20 to move along the axial direction of the magnetic yoke iron core 101. The elastic part 60 is arranged between the armature 50 and the magnetic yoke iron core 101, and the elastic part 60 has a pre-tightening force that enables the armature 50 to be far away from the magnetic yoke iron core 101. The number of the elastic part 60 may one or more.

It should be noted that the axial direction of the magnetic yoke iron core 101 is the thickness direction of the magnetic yoke iron core 101. After the magnetic yoke iron core 101 forms the brake, the axis of the braked shaft penetrates through the center of the magnetic yoke iron core 101 along the thickness direction of the magnetic yoke iron core 101. That is, the center line which penetrates through the magnetic yoke iron core 101 along the thickness direction coincides with the axis of the braked shaft. The first shaft end is the first side of the magnetic yoke iron core 101, and the second shaft end is the second side of the magnetic yoke iron core 101. The first side and the second side are different sides of the magnetic yoke iron core 101 distributed along its own thickness direction. The second mounting space 12 may also be referred to as a second mounting groove. The magnetic yoke iron core 101 may also be referred to as a yoke, a housing, a magnetic conducting housing, a conducting magnet, a shell, or the like. The magnetic yoke iron core 101 and the armature 50 themselves are not magnetic. Those skilled in the art can understand that when the coil 40 is energized, both the magnetic yoke iron core 101 and the armature 50 are magnetized to produce magnetism, and they attract each other. While when the coil 40 is not energized, the magnetism of the magnetic yoke iron core 101 and the armature 50 disappears.

It should be noted that when there are two friction disks 30, the first movable plate 20 is provided with one, and the second movable plate 22 is provided with one; when the friction disk 30 is provided with three or more numbers, the first movable plate 20 is provided with one, and the second movable plate 22 is provided with two or more numbers.

It should be noted that the brake provided in this embodiment has only one coil, which corresponds to the case that the magnetic yoke iron core 101 provided in the previous embodiment only has a second mounting space 12. The previous embodiment also provides a case where the magnetic yoke iron core 101 has two mounting spaces, that is, in addition to the second mounting space 12, there is also a third mounting space 18. In this case, the number of coils in this embodiment may be adaptively changed, that is, the brake has two coils. The two coils may be connected in series and controlled by a switch. The two coils may also be connected in parallel and controlled by different switches. When the two coils are connected in series, since the brake requires large voltage absorption and small voltage maintenance during operation, a control switch that can adjust the voltage needs to be configured at this time. When two coils are connected in parallel, in order to achieve the effect of large voltage adsorption and small voltage maintenance, the two coils can be energized at the same time when large voltage is required. When a small voltage is required, because the two coils may be controlled independently, one coil can be powered on and the other coil can be powered off; at this time, there is no need to configure a control switch that can adjust the voltage, which can reduce the manufacturing cost of the brake.

The working principle of the brake provided in this embodiment is as follows. When the brake is in use, the coil 40 is connected to the external power supply. When energizing the coil 40 (one or two), the magnetic yoke iron core 101 and the armature 50 generate magnetic force attracting each other under the excitation of the coil 40. The magnetic force attracts the armature 50, and the armature 50 moves close to the first shaft end, compresses the elastic part 60, and drives the first movable plate 20 to move away from the second shaft end. During the movement of the first movable plate 20 away from the second shaft end, the first movable plate 20 separates from the friction disk 30 and releases the friction disk 30. The friction disk 30 is no longer pressed, and the rotation of the friction disk 30 is released. At this time, the friction disk 30 is matched with the braked shaft or shaft sleeve 70 and rotates normally. When the power is cut off, the magnetic force on the magnetic yoke iron core 101 and the armature 50 disappears, and the elastic part 60 releases to push the armature 50. The armature 50 moves away from the first shaft end. When the armature 50 moves, it drives the first movable plate 20 and the second movable plate 22 close to the second shaft end of the magnetic yoke iron core 101, causing the first movable plate 20 and the second movable plate 22 to squeeze with their adjacent friction disks 30. The friction disk 30 close to the armature 50 will also rub with the structure of clamping the friction disk 30 with the second movable plate 22 to generate friction. Under the action of friction, the rotating speed of friction disk 30 gradually decreases until it drops to zero, completing the braking process.

Compared with the traditional brake, the brake provided by this embodiment has at least the following two major improvements.

Figure 20:
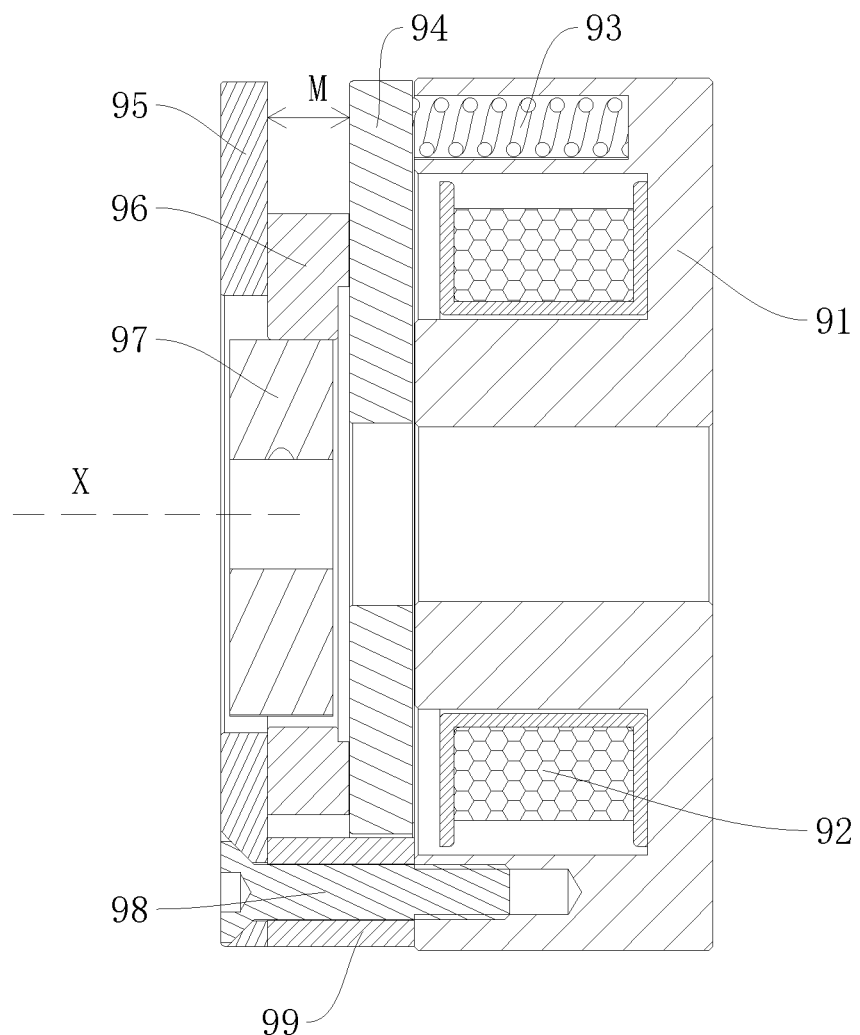
FIG. 20 is a schematic structural diagram of the stacked brake in the prior art.

A major improvement in the first aspect is the arrangement of the friction disk 30. In the traditional brake, as shown in FIG. 20, the friction disk 96 and the magnetic yoke 91 are stacked in the axial direction, and the friction disk 96 is located outside the magnetic yoke 91. In the brake provided by this embodiment, the friction disk 30 is located inside the magnetic yoke iron core 101, so the friction disk 30 does not increase the overall thickness of the brake.

A major improvement in the second aspect is the manner in which the friction disk 30 is clamped. In the traditional brake, as shown in FIG. 20, when braking, the friction disk 96 is clamped by the armature 94 and the tail plate 95. In the brake provided by this embodiment, one of the plurality of friction disks 30 is clamped by the first movable plate 20 and the second movable plate 22, and another one of the plurality of friction disks 30 is clamped by the second movable plate 22 and a structure that can cooperate with the second movable plate 22 to clamp the friction disk 30 (this structure, like the first movable plate 20 and the second movable plate 22 and the friction disk 30, is also located inside the magnetic yoke iron core 101, and does not increase the overall thickness of the brake), the remaining friction disks 30 are clamped by two adjacent second movable plates 22. The movable plate 20 is connected with the armature 50 and moves axially driven by the armature 50 to clamp or loosen the friction disk 30. It should be noted that the above-mentioned clamping manner in which the friction disk 30 is clamped can ensure that the brake provided in this embodiment is a power-off braking, that is, when the coil 40 is powered off, the brake is in a braking state. Compared with power-on braking, those skilled in the art can understand that power-off braking is a safer way.

Compared with the traditional brake, the brake provided by this embodiment has many advantages.

Firstly, in the brake provided by this embodiment, the first movable plate 20, the second movable plate 22, the friction disk 30 and the coil 40 are all inside the magnetic yoke iron core 101. The thickness of individual parts such as the first movable plate 20, the second movable plate 22, the friction disk 30 and the coil 40 will not increase the overall thickness of the brake, which greatly reduces the overall thickness of the brake. For example, the thickness of an existing brake is 14 mm. If the existing brake is modified according to the structure provided in this embodiment, the thickness of the existing brake can be easily reduced to 7 mm, and the thickness reduction effect is obvious. Regardless of the small air gap between the magnetic yoke iron core 101 and the armature 50, the overall thickness of the brake provided by this embodiment only depends on the sum of the thicknesses of the magnetic yoke iron core 101 and the armature 50.

Secondly, the thickness of the magnetic yoke iron core 101 does not have to be excessively reduced, so the space for accommodating the coil 40 can be guaranteed. The volume of the coil 40 does not have to be excessively compressed, which avoids the problems of weakening the magnetic field and increasing the heating power.

Thirdly, the thickness of the first movable plate 20, the second movable plate 22 and the friction disk 30 as friction pair parts does not increase the overall thickness of the brake. Therefore, the thickness of the first movable plate 20, the second movable plate 22 and the friction disk 30 can be guaranteed. The thickness of the first movable plate 20, the second movable plate 22 and the friction disk 30 need not be excessively reduced, which produces at least the following four advantages. Firstly, the rigidity of the parts is guaranteed, and the probability of creep and stress deformation of the parts is greatly reduced. Secondly, the materials of parts will not be reduced, and the heat capacity of parts can be guaranteed. During the friction process, the parts will not rise too fast, which greatly reduces the probability of adverse conditions such as braking force attenuation and thermal stress deformation. Thirdly, the thickness of the parts will not be too thin, and the parts will not amplify the noise or make the noise more sharp during friction. In fact, the brake provided in this embodiment has low noise, and is especially suitable for occasions with high speed and high requirements for silence. The friction disk 30, the first movable plate 20 and the second movable plate 22 are located in the first mounting space 11. When the brake works, the friction disk 30, the first movable plate 20 and the second movable plate 22 are surrounded by the magnetic yoke iron core 101 and the surrounding parts. In addition to the small friction noise itself, the outward propagation path of friction noise is also closed, which further reduces noise. Fourthly, the thickness of friction disk 30 can be appropriately increased, which can not only improve the overall structural strength of the friction disk 30 and facilitate processing, but also easily ensure the perpendicularity of the middle hole and the friction surface, and increase the matching length between the friction disk 30 and the shaft sleeve 70 or the braked shaft, so as to reduce the shake, noise and drag torque during rotation.

Fourthly, compared with the friction disk of the traditional brake, the friction disk 30 in this embodiment has smaller radius and greater thickness, lower manufacturing difficulty and cost, and good stability during operation. At the same speed, the friction disk with smaller radius has lower linear friction speed, less wear and long service life. The friction disk with smaller radius has smaller linear speed of its outer ring and small moment of inertia, which can reduce the throwing out of dust. Since the friction disk 30 is located inside the magnetic yoke iron core 101, the thrown dust is also left inside the magnetic yoke iron core 101, which is conducive to the cleanliness of the working environment of the brake. In particular, the dust is left inside the magnetic yoke iron core 101, which can prevent the dust from entering the air gap between the magnetic yoke iron core 101 and the armature 50. If entering the air gap, the dust will affect the axial movement of armature 50, thereby affecting the normal operation of the brake.

Fifthly, compared with the traditional brake, in the brake provided by this embodiment, the armature 50 does not contact and rub with the friction disk 30, which produces at least two advantages. Firstly, the accuracy requirements of the armature 50 are reduced, thereby reducing the manufacturing cost of the armature 50. Secondly, the armature 50 will not produce high temperature and deformation due to friction, and its magnetic properties are stable. The armature in the traditional brake would produce high temperature and deformation due to friction, which would affect the magnetic properties and deteriorate the magnetic properties. In the brake provided by this embodiment, instead of the armature and tail plate, the parts that rub with the friction disk 30 are the first movable plate 20, the second movable plate 22 and the structure that can clamp the friction disk 30 in cooperation with the first movable plate 20. The structure, the first movable plate 20 and the second movable plate 22 need not to be made of soft magnetic materials, and the materials can be selected in a wider range during design, with low design difficulty and cost. Moreover, the first movable plate 20 and the second movable plate 22 do not need to be used as a magnetic circuit to generate a magnetic field. Therefore, high temperature and a small amount of deformation do not affect the normal operation of the first movable plate 20 and the second movable plate 22, which improves the reliability of the brake. In addition, the first movable plate 20, the second movable plate 22 and the friction disk 30 have the small radius and appropriate thickness. Therefore, the first movable plate 20 and the second movable plate 22 have the same advantages as the friction disk 30 in the above fourth aspect.

Sixthly, the plurality of friction disks 30 can increase the torque. Compared with a single friction disk 30, it can achieve high torque under the same outer diameter size and power conditions, and it also does not increase the overall thickness. It has great advantages over the traditional stacked structure.

In this embodiment, the magnetic yoke iron core 101 is provided with a wiring opening 121 communicating with the second mounting space 12. The lead wire of the coil 40 can extend out through the wiring opening 121 to connect the power supply.

Figure 6:
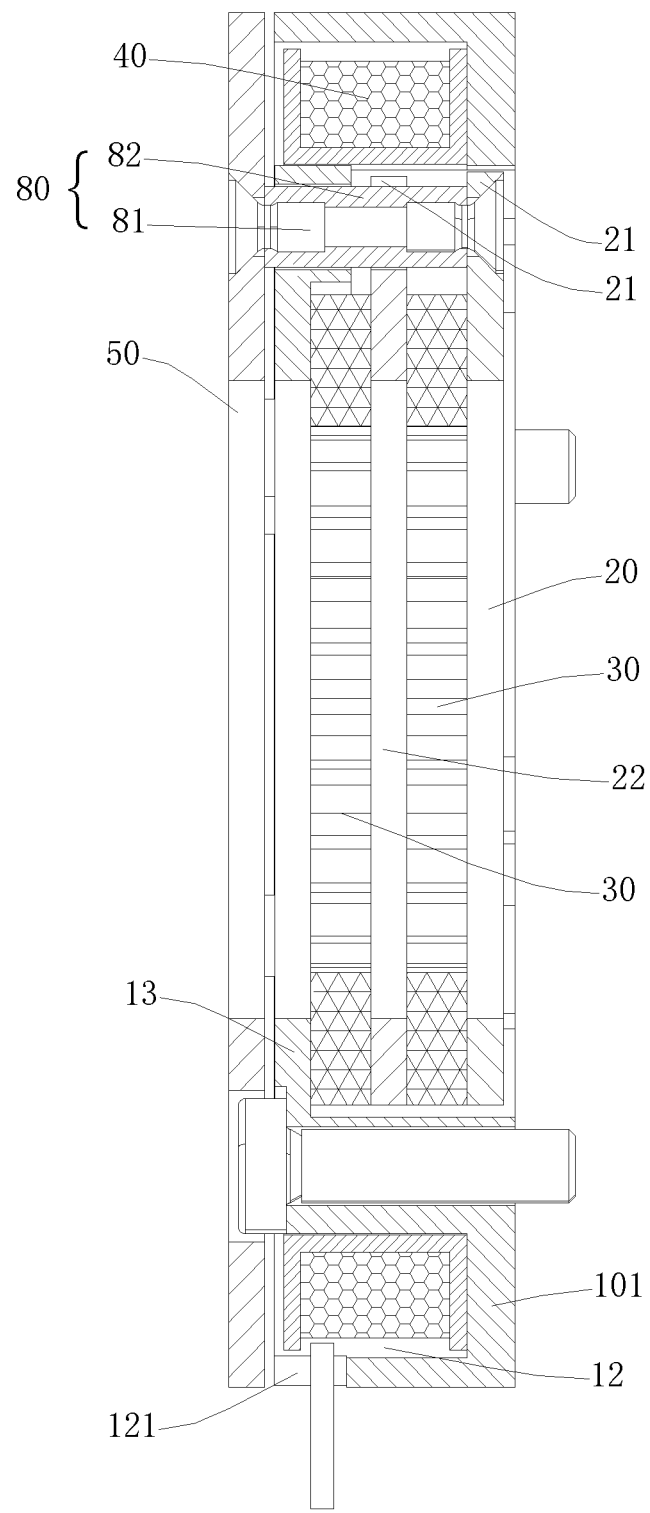
FIG. 6 is a schematic sectional structural diagram along line A-A of FIG. 5.
Figure 7:
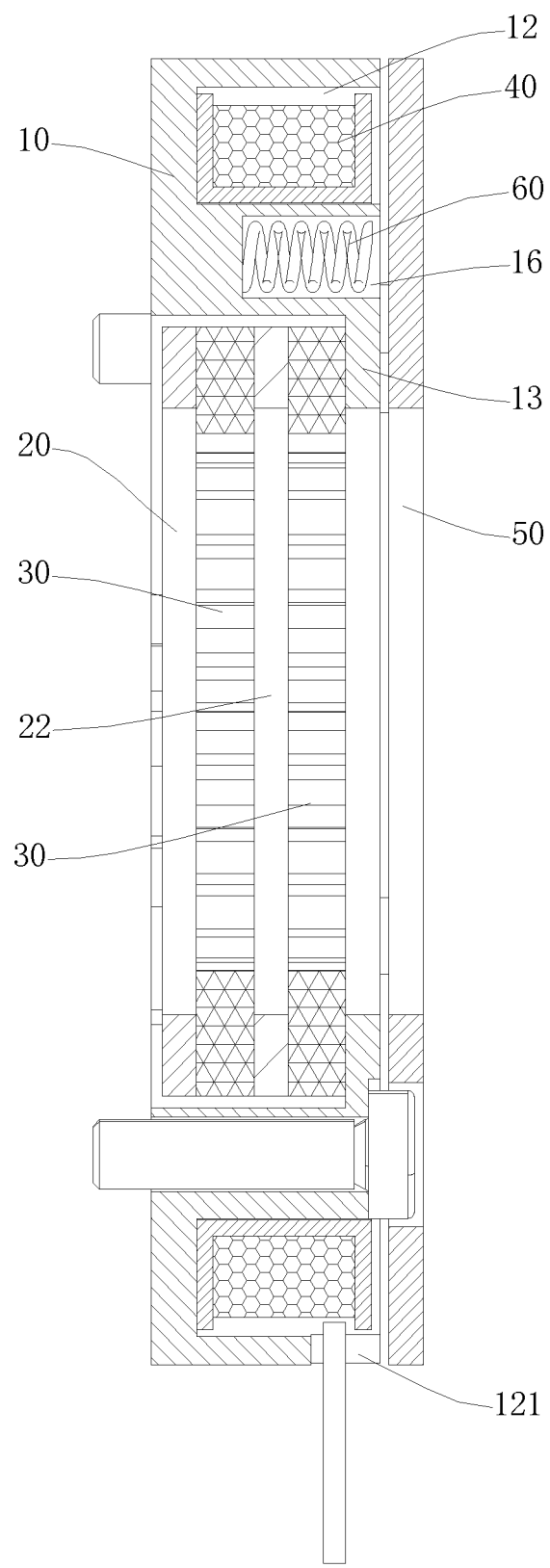
FIG. 7 is a schematic sectional structural diagram along line B-B of FIG. 5.
Figure 8:
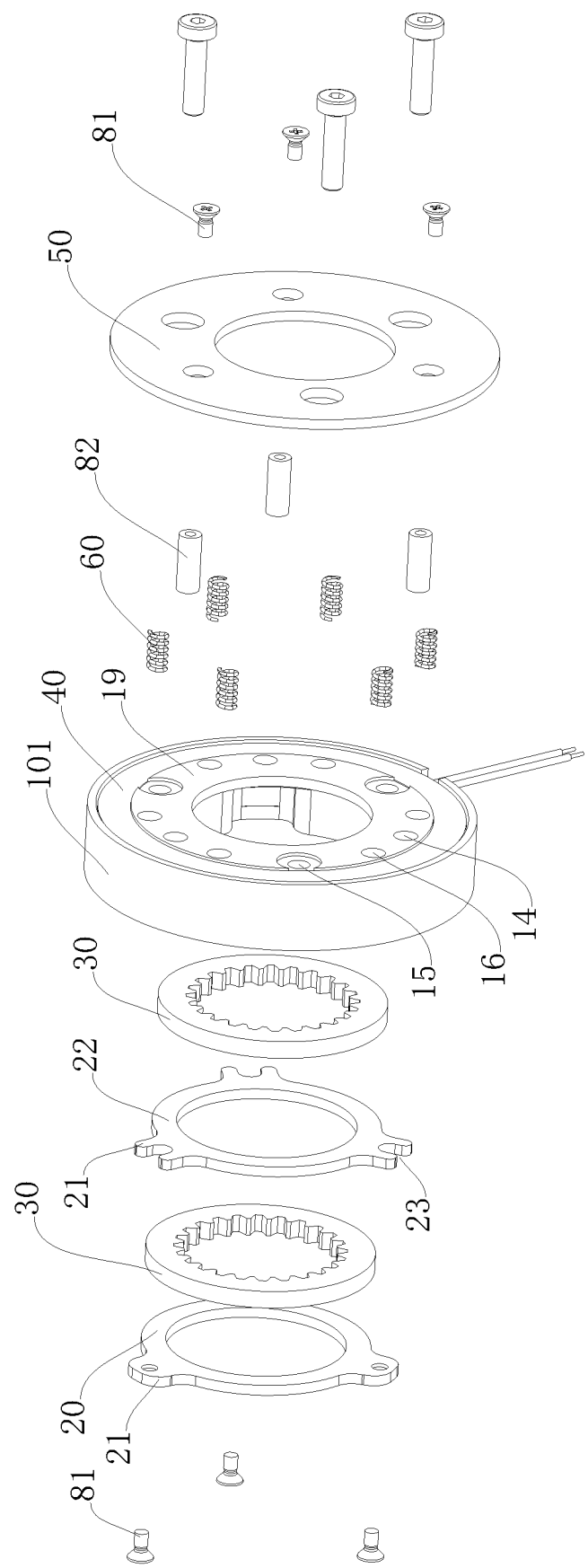
FIG. 8 is a schematic explosive structural diagram 1 of the brake provided by one embodiment of the present application.
Figure 9:
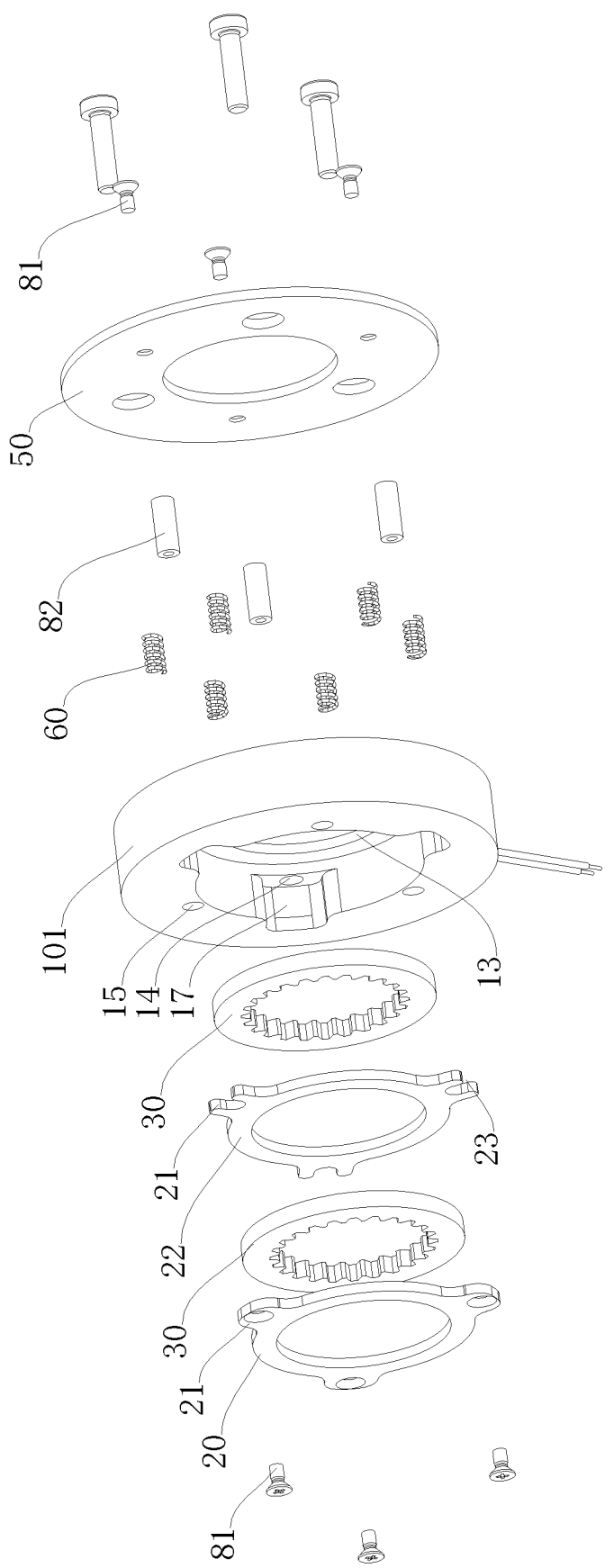
FIG. 9 is a schematic explosive structural diagram 2 of the brake provided by one embodiment of the present application.

In some embodiments, a specific embodiment of the connector 80 may adopt the structure shown in FIG. 6, FIG. 8 and FIG. 9. Refer to FIG. 6, FIG. 8 and FIG. 9, each the connector 80 includes a guide pole 82 and two connecting parts 81. The guide pole 82 is penetrated into the magnetic yoke iron core 101, and one end of the guide pole 82 is connected to the first movable plate 20 through one of the two connecting parts 81; the other end of the guide pole 82 is connected to the armature 50 through the other one of the two connecting parts 81. The at least one second movable plate 22 is slidably connected with the guide pole 82. The guide pole 82 slides and fits with the magnetic yoke iron core 101. When the armature 50 drives the first movable plate 20 to move back and forth along the axial direction of the magnetic yoke iron core 101, the action is stable and smooth. The second movable plate 22 is slidably connected to the guide pole 82. When the first movable plate 20 is close to the magnetic yoke iron core 101 and squeezes the friction disk 30, it can also squeeze the second movable plate 22 so that the second movable plate 22 is clamped by the two friction disks 30 to generate braking force.

Generally, the axis of the guide pole 82 is parallel to the axis of the magnetic yoke iron core 101. The guide pole 82 is fixedly connected with the first movable plate 20 and the armature 50 through the two connecting parts 81 respectively. There are no restrictions on the implementation of the connecting part 81, such as bolts, screws, pins, rivets, etc. Whether the two connecting parts 81 are implemented in the same way is not limited; that is, the two connecting pails 81 may adopt the same implementation method or different implementation methods.

The guide pole 82 may also be fixedly connected with the first movable plate 20 and the armature 50 by welding or integral molding. For example, when the integral molding method is adopted, the guide pole 82 may be integrated with the first movable plate 20; that is, one end of the guide pole 82 is fixedly connected with the first movable plate 20 by integral molding, and the other end of the guide pole 82 is fixedly connected with the armature 50 by other methods except integral molding.

In conclusion, the present application is not limited to the fixed connection mode between the guide pole 82 and the first movable plate 20 or between the guide pole 82 and the armature 50. All known fixed connection modes without creative work are within the protection scope of this application.

In some embodiments, a specific embodiment of the first movable plate 20 and the second movable plate 22 may adopt the structure shown in FIG. 1, FIG. 3 and FIG. 9. Refer to FIG. 1, FIG. 3 and FIG. 9, the end surface of the first shaft end of the magnetic yoke iron core 101 is formed with a positioning slot 17, and the positioning slot 17 is connected with the first mounting space 11, and the connector 80 passes through the positioning slot 17. The outer circumference of the first movable plate 20 and the second movable plate 22 are provided with a locating block 21 (or radial extension part) corresponding to the positioning slot 17 (or avoidance slot). The positioning slot 17 is used to avoid the locating block 21 in the spatial relationship, and the connector 80 is connected with the locating block 21. When the first movable plate 20 and the second movable plate 22 are installed, the locating block 21 of the first movable plate 20 and the locating block 21 of the second movable plate 22 are located in the positioning slot 17, which can play a role of limiting effect and facilitate installation. It should be noted that the locating block 21 of the first movable plate 20 is connected with one connecting part 81 of the connector 80 (fixed connection), and the other connecting part 81 of the connector 80 is connected with the armature 50 (also fixed connection). The locating block 21 on the second movable plate 22 slides and fits with the guide pole 82. The depth of the positioning slot 17 is greater than the sum of the thickness of all the locating blocks 21 located in the positioning slot 17, so as to ensure that all the movable plates have a degree of freedom to move along the thickness direction of the brake. The first movable plate 20 can move along the axial direction of the magnetic yoke iron core 101 (that is, the thickness direction of the magnetic yoke iron core 101 and the thickness direction of the brake) driven by the armature 50. When the first movable plate 20 moves towards the second shaft end, the second movable plate 22 sliding with the guide pole 82 is indirectly squeezed by the first movable plate 20 and can also move with the first movable plate 20.

The depth of the positioning slot 17 is determined by factors such as the thickness of the locating block 21 and the axial moving distance of the movable plate. The axial moving distance of the first movable plate 20=the length of the guide pole 82−the thickness of all friction disks 30−the thickness of all locating blocks 21 in the same positioning slot 17−the thickness of the extending portion 13. Similarly, the moving distance of the second movable plate 22 can be obtained. The depth of the positioning slot 17≥ the moving distance of the first movable plate 20+the second movable plate 22+the thickness of the two movable plates themselves (generally, the thickness of the movable plate is equal to the thickness of the locating block 21).

In this embodiment, the locating block 21 on the second movable plate 22 is recessed towards the axis of the second movable plate 22 to form a clamping slot 23, which slides and fits with the guide pole 82 to realize the sliding connection between the second movable plate 22 and the guide pole 82.

Figure 19:
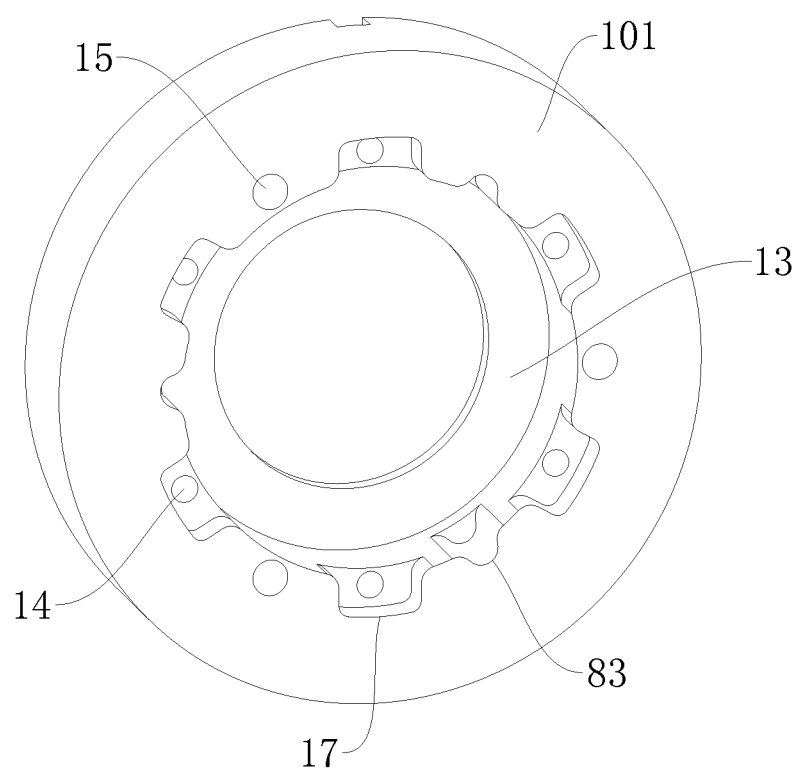
FIG. 19 is a schematic three-dimensional structural diagram of the magnetic yoke iron core provided by one embodiment of the present application.

The above discussion is about the situation that the locating blocks 21 of two movable plates share the positioning slot 17. In addition, the locating blocks 21 do not share the positioning slot 17. As shown in FIG. 19, the magnetic yoke iron core 101 is provided with not only a positioning slot 17, but also a guide slot 83. The positioning slot 17 and the guide slot 83 are mutually staggered in the circumferential direction. Accordingly, the locating blocks 21 of the first movable plate 20 and the second movable plate 22 are also staggered from each other in the circumferential direction. The locating block 21 of the first movable plate 20 is located in the positioning slot 17, and the locating block 21 of the second movable plate 22 is located in the guide slot 83. The first movable plate 20 is connected with the guide pole 82 through the locating block 21, and the guide pole 82 slides in the connecting hole 14 to guide the axial movement of the first movable plate 20. The second movable plate 22 is slidably connected with the guide slot 83 through the locating block 21 to realize the guidance of axial movement. At this time, the locating block 21 on the second movable plate 22 does not need to be provided with a clamping slot 23. In this case, the depth of the positioning slot 17 and the guide slot 83 are generally different. Generally, since the depth of the second movable plate 22 is greater than that of the first movable plate 20, the depth of the guide slot 83 is also greater than that of the positioning slot 17. That is, when the first movable plate 20 and the second movable plate 22 do not share the positioning slot 17, for example, as shown in FIG. 19, the depth of the positioning slot 17 (or guide slot 83) is determined according to the depth of its corresponding movable plate. The greater the depth of the movable plate, that is, the closer it is to the extending portion 13, the greater the depth of the positioning slot 17 (or guide slot 83) corresponding to the movable plate.

The depth of the positioning slot 17 discussed above is provided that all the movable plates are always located in the first mounting space 11, that is, even if all the movable plates moves axially, it will not protrude from the surface of the magnetic yoke iron core 101. It should be noted that in some cases, the installation space of the brake is relatively loose, and the movable plate can protrude from the surface of the magnetic yoke iron core 101, that is, even if the movable plate protrudes from the surface of the magnetic yoke iron core 101, it will not interfere with other parts. At this time, the depth of the positioning slot 17 can be appropriately reduced or even zero, that is, the positioning slot 17 is not set. It is essentially the guide pole 82 that guides the axial movement of the first movable plate 20 and the second movable plate 22, so even if the positioning slot 17 is not set, the axial movement of the movable plate will not be affected.

In some embodiments, an improved embodiment of the positioning slot 17 may adopt the structure shown in FIG. 9. Refer to FIG. 9, there may be a plurality of positioning slots 17, that is, the number of the positioning slots 17 may be three or more. The plurality of positioning slots 17 are evenly distributed around the axis of the magnetic yoke iron core 101 (i.e. the center line passing through the magnetic yoke iron core 101 along the thickness direction). The locating block 21 of the first movable plate 20 and the locating block 21 of the second movable plate 22 need to be matched with the connector 80. With the increase of the number of positioning slots 17, the number of locating blocks 21 of the first movable plate 20 and the second movable plate 22 will also increase accordingly, and the driving force generated by the armature 50 will be more evenly transmitted to the movable plate, resulting in better braking effect.

Figure 10:
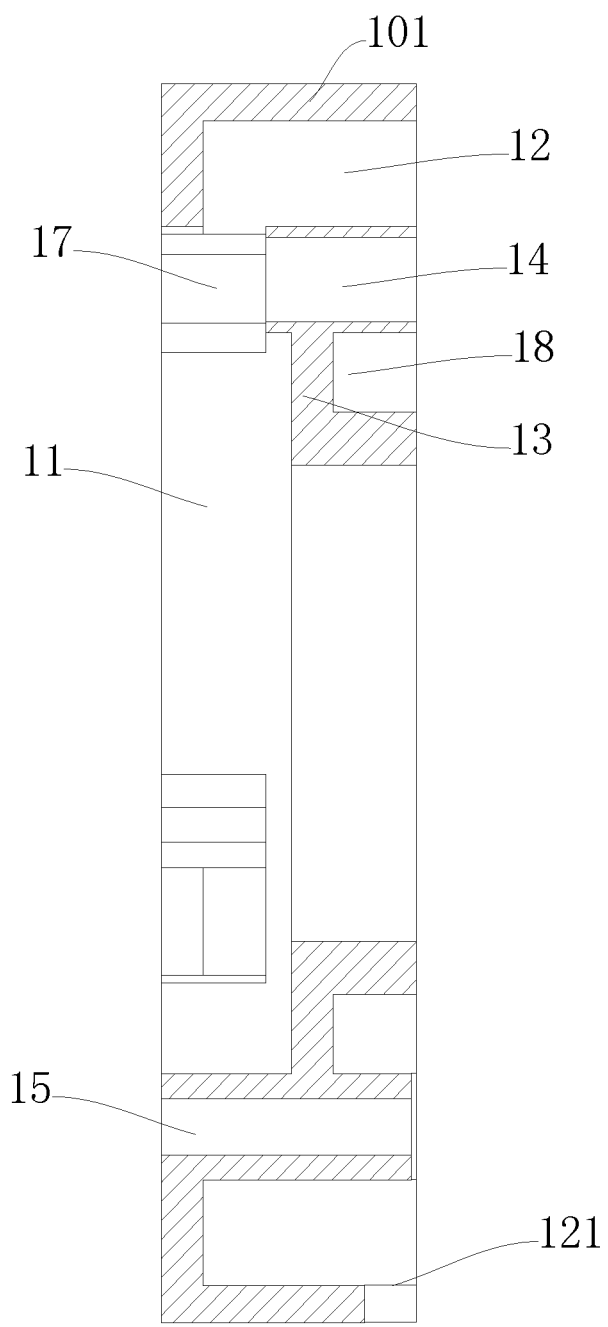
FIG. 10 is a schematic sectional structural diagram of the magnetic yoke iron core adopted by the brake provided by one embodiment of the present application.
Figure 11:
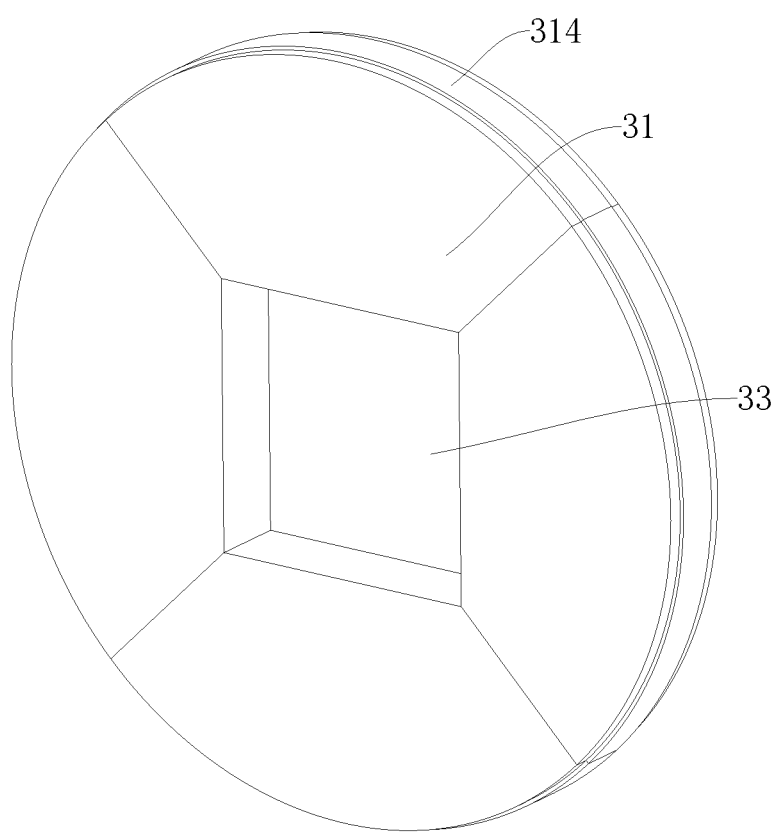
FIG. 11 is a schematic three-dimensional structural diagram of the friction disk adopted by the brake provided by one embodiment of the present application.

As shown in FIG. 10, the positioning slot 17 is close to the second mounting space 12 and the third mounting space 18. Accordingly, the coil located in the second mounting space 12 and the third mounting space 18 is also close to the positioning slot 17. In this case, since the magnetic conductive material is removed from the positioning slot 17, which may have a negative impact on the magnetic circuit, the number of positioning slot 17 should not be too large. Not only the number of positioning slot 17, but also the depth of positioning slot 17 will have a negative impact on the magnetic circuit. If the radial width of the mounting area 19 is large, the distance between the positioning slot 17 and the two mounting spaces (the second mounting space 12 and the third mounting space 18) and the coils located in the two mounting spaces is far, or the depth of the positioning slot 17 is small, in other embodiments, the positioning slot 17 may be other structures. For example, the positioning slot 17 may no longer be an independent and separate slot as shown in FIG. 9, but an annular slot around the middle of the magnetic yoke iron core 101 and coaxial with the magnetic yoke iron core 101. The structural form of the positioning slot 17 can be flexibly designed according to its application environment.

In some embodiments, an improved embodiment of the magnetic yoke iron core 101 may adopt the structure shown in FIG. 5-FIG. 9. Refer to FIG. 5-FIG. 9, an annular mounting area 19 for installing the connector 80 is formed on the magnetic yoke iron core 101. The mounting area 19 is located between the first mounting space 11 and the second mounting space 12, that is, along the radial direction, the first mounting space 11 is located on the innermost side, the second mounting space 12 is located on the outermost side, and the mounting area 19 is located between them. The mounting area 19 is also provided with at least one mounting hole 15, which is arranged alternately with the at least one connector 80. When installing the brake, the user may insert a bolt into the mounting hole 15 and install the brake to an external object through the bolt to realize the installation. The at least one mounting hole 15 and the at least one connector 80 are arranged alternately, which can ensure the firm installation of the brake, so as to have good stability when in use.

When the bake is mounting to an external object, the end surface of the first shaft end may be used as the mounting flange face. The brake may be fixed to an external object by connecting parts such as bolts, pins and rivets threaded into the mounting hole 15. At this time, the end surface of the first shaft end is close to the external object. In addition, the second shaft end may be used to install the brake. When the brake is installed with the second shaft end, a convex stand needs to be set at the second shaft end to leave axial movement space for the armature 50. The convex stand may be arranged on the magnetic yoke iron core 101 and protrude to the outside of the magnetic yoke iron core 101 along the thickness direction of the magnetic yoke iron core 101. The projection height of the convex stand is greater than the sum of the thickness of the armature 50 and the axial moving distance of the armature 50. The convex stand may also be an integral structure with the magnetic yoke iron core 101 or a split structure. The convex stand may also be a separate part and may also be arranged on an external object. The convex stand may be an integral structure with the external object or a split structure with the external object.

In this embodiment, the connector 80 is located in the connecting hole 14. The at least one mounting hole 15 and the at least one connector 80 are arranged alternately, that is, the at least one mounting hole 15 and the at least one connecting hole 14 are arranged alternately. As an alternative embodiment, the at least one mounting hole 15 may not be arranged alternately with the at least one connecting hole 14, but the alternating arrangement in this embodiment is more conducive to the stability of the brake during operation.

In other embodiments, the mounting hole 15 may not be in the mounting area 19. For example, the mounting hole 15 may be located in the outer ring of the magnetic yoke iron core 101. Alternatively, a portion extending outward in the radial direction may be arranged on the edge of the magnetic yoke iron core 101, and the mounting hole 15 may be arranged on the portion extending outward. The position of the mounting hole 15 is related to factors such as the installation environment of the brake. The technical scheme of modifying the position of the mounting hole 15 and the structure according to the installation environment and other factors is within the protection scope of this application.

In some embodiments, an improved embodiment of the magnetic yoke iron core 101 may adopt the structure shown in FIG. 5-FIG. 10. Refer to FIG. 5-FIG. 10, the side of the first mounting space 11 close to the second shaft end has an extending portion 13. The extending portion 13 extends from the inner wall to the center of the magnetic yoke iron core 101. In general, the extending portion 13 is in the shape of an annular plate, and the inner diameter of the extending portion 13 is less than the outer diameter of the friction disk 30. After the brake is assembled, the extending portion 13 and the first movable plate 20 are located at both ends of all friction disks 30 respectively (that is, all friction disks 30 are located between the extending portion 13 and the first movable plate 20). Then, in the power-off state, the armature 50 drives the first movable plate 20 to approach and squeeze the adjacent friction disk 30, which squeezes the second movable plate 22, and the second movable plate 22 squeezes another friction disk 30 (assuming that the number of friction disks 30 is two or more). Therefore, the two end surfaces (i.e. two sides) of the friction disk 30 have three contact states: (1) one end surface of the friction disk 30 rubs with the first movable plate 20, and the other end surface rubs with the second movable plate 22; (2) both end surfaces of the friction disk 30 rub against the second movable plate 22 (in this case, the number of the second movable plate 22 is two or more); (3) one end surface of the friction disk 30 rubs with the second movable plate 22, and the other end surface rubs with the extending portion 13. No matter which of the above three states, the two end surfaces of each friction disk 30 can rub and generate braking force.

A structure clamping the friction disk 30 in cooperation with the first movable plate 20 is mentioned in the first embodiment, but the specific implementation of the structure is not limited. The extending portion 13 is a specific implementation of the structure in this embodiment. The extending portion 13 may be integrally formed with the magnetic yoke iron core 101, or may be an independent part fixedly mounted to the magnetic yoke iron core 101. When the extending portion 13 is machined integrally with the magnetic yoke iron core 101, the extending portion 13 has a high forming accuracy. The fitting accuracy between the extending portion 13 and the friction disk 30 is high and the friction effect is good.

The armature 50 of the brake provided in the present application does not contact and rub with the friction disk 30. Therefore, the brake provided in the present application has advantages over the traditional brake. It is emphasized here again that in the traditional brake, as shown in FIG. 20, the armature 94 contacts and rubs with the friction disk 96. The armature 94 is made of soft magnetic material. The high temperature and deformation caused by friction would affect the shape and magnetism of the armature 94. After the shape of the armature 94 is changed, it would not rub well with the friction disk 96, thereby adversely affecting the braking. After the magnetism of the armature 94 is changed, it would not be able to be effectively attracted when the coil is energized, which will adversely affect the separation of the armature 94 and the friction disk 96. In the brake provided by this embodiment, the first movable plate 20 and the extending portion 13 are used to replace some functions of the armature 94 and the tail plate 95 of the traditional brake (functions in terms of friction braking). Compared with the armature 94 and the tail plate 95, the first movable plate 20 and the extending portion 13 are easier to design and process, and have higher stability during operation.

In some embodiments, an improved embodiment of the magnetic yoke iron core 101 can adopt the structure shown in FIG. 2, FIG. 4, FIG. 7, FIG. 8 and FIG. 9. Refer to FIG. 2, FIG. 4, FIG. 7, FIG. 8 and FIG. 9, the mounting area 19 is also provided with at least one blind hole 16 with opening towards the second shaft end. The at least one elastic part 60 is correspondingly installed in the at least one blind hole 16. The number of the elastic part 60 and the blind hole 16 is the same. On the annular path where the connecting holes 14 are distributed, blind holes 16 are arranged on both sides of each connecting hole 14. When the coil 40 is powered off, the armature 50 drives the first movable plate 20 and the second movable plate 22 to squeeze the friction disk 30 under the action of the elastic part 60. If the blind hole 16 is not provided, the spring (i.e. the elastic part 60, hereinafter referred to as the spring) may be directly arranged between the armature 50 and the magnetic yoke iron core 101. However, in this case, the spring cannot be guided, and the selection specification of the spring will be limited. In this embodiment, when the blind hole 16 is set and the spring is in the blind hole 16, the inner wall of the blind hole 16 can play a certain guiding role when the spring expands and contracts, and the spring may choose a longer specification and have a longer service life.

For example, there is a connecting hole 14 between each two mounting holes 15, and there is a blind hole 16 on both sides of the connecting hole 14, and the blind holes 16 on both sides of the connecting hole 14 are also between the two mounting holes 15. The distribution of the mounting holes 15, the connecting holes 14 and the blind holes 16 may also adopt other forms. The distribution form of the hole structure in the mounting area 19 may be flexibly designed according to the application environment.

In some embodiments, a specific embodiment of the friction disk 30 may adopt the structure shown in FIG. 11-FIG. 18. In traditional friction disk, only the planes on both sides may participate in friction as working surfaces. In contrast, the circumferential surface of the friction disk 30 provided by the embodiment may also participate in friction as a working surface. Refer to FIG. 11-FIG. 18, each the friction disk 30 includes an elastic component 32 and a plurality of friction monomers 31. The plurality of friction monomers 31 are distributed in an annular array around the axis of the magnetic yoke iron core 101 and enclosed to form a central space 33. Each the friction monomer 31 has a freedom to approach or move away from the central space 33 along a radial direction of the magnetic yoke iron core 101, and the elastic component 32 is respectively connected with the plurality of friction monomers 31; the elastic component 32 is configured with a pre-tightening force to make each the friction monomer 31 close to the central space 33.

It should be noted that the elastic component 32 is respectively connected with a plurality of friction monomers 31, which means that the elastic component 32 includes a plurality of elastic parts, and the plurality of elastic parts are respectively connected with the friction monomers 31. The friction monomer 31 may also be referred to as a unit block. Generally, the friction disk 30 is in a round cake shape and has a certain thickness. The axis of the magnetic yoke iron core 101 is the center line passing through the magnetic yoke iron core 101 along the thickness direction.

In the initial state, each friction monomer 31 is close to each other. When the rotational speed of the friction disk 30 exceeds the preset value (within or beyond the allowable rotational speed), the centrifugal force generated by the friction monomer 31 overcomes the pre-tightening force of the elastic component 32, and the friction monomer 31 moves away from the central space 33 along the radial direction of the magnetic yoke iron core 101. At this time, the two adjacent friction monomers 31 will be separated from each other to produce a gap, the overall outer diameter of the friction disk 30 increases, and the outer arc surface of the friction monomer 31 contacts the inner wall of the first mounting space 11 to produce friction and braking.

The traditional friction disk is an integrated structure. The friction disk provided in this embodiment is a split structure, that is, the friction disk 30 is composed of a plurality of friction monomers 31. The plurality of friction monomers 31 are separated from each other at a certain speed for the friction disk 30 provided by this embodiment by using the split structure, so as to increase the overall outer diameter of the friction disk 30 and the outer arc surface of the friction monomer 31 can participate in friction as a working surface. The friction can provide additional braking force when the friction disk 30 (and the braked shaft) rotates at high speed, which enhances the reliability of the brake. The above additional braking force can not only increase the original braking force (i.e. the braking force generated by plane friction on both sides), but also replace the original braking force to realize braking in case of brake failure and failure to generate the original braking force.

It should be noted that the displacement of each friction monomer 31 is the same and the outer arc surface of each friction monomer 31 is located on the same cylindrical surface in the process of away from the central space 33 and separation. The cylindrical surface is coaxial with the friction disk 30, and the radius of the cylindrical surface changes with the movement of the friction monomer 31.

Figure 12:
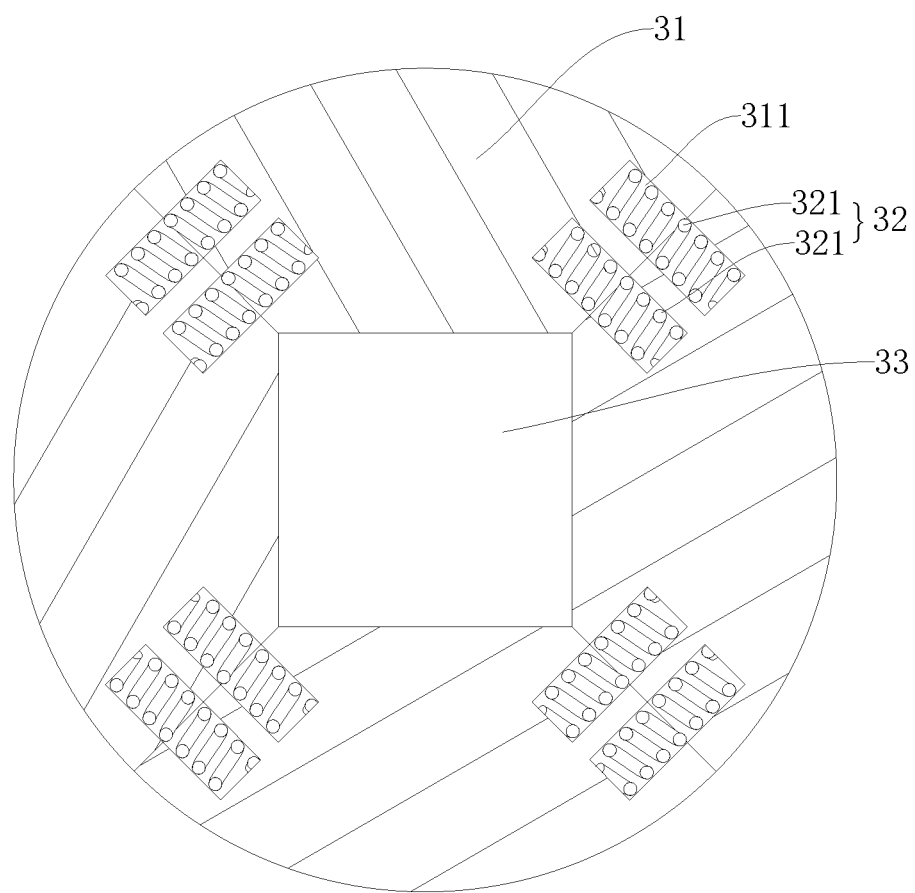
FIG. 12 is a schematic sectional structural diagram of the friction disk adopted by the brake provided by one embodiment of the present application.
Figure 13:
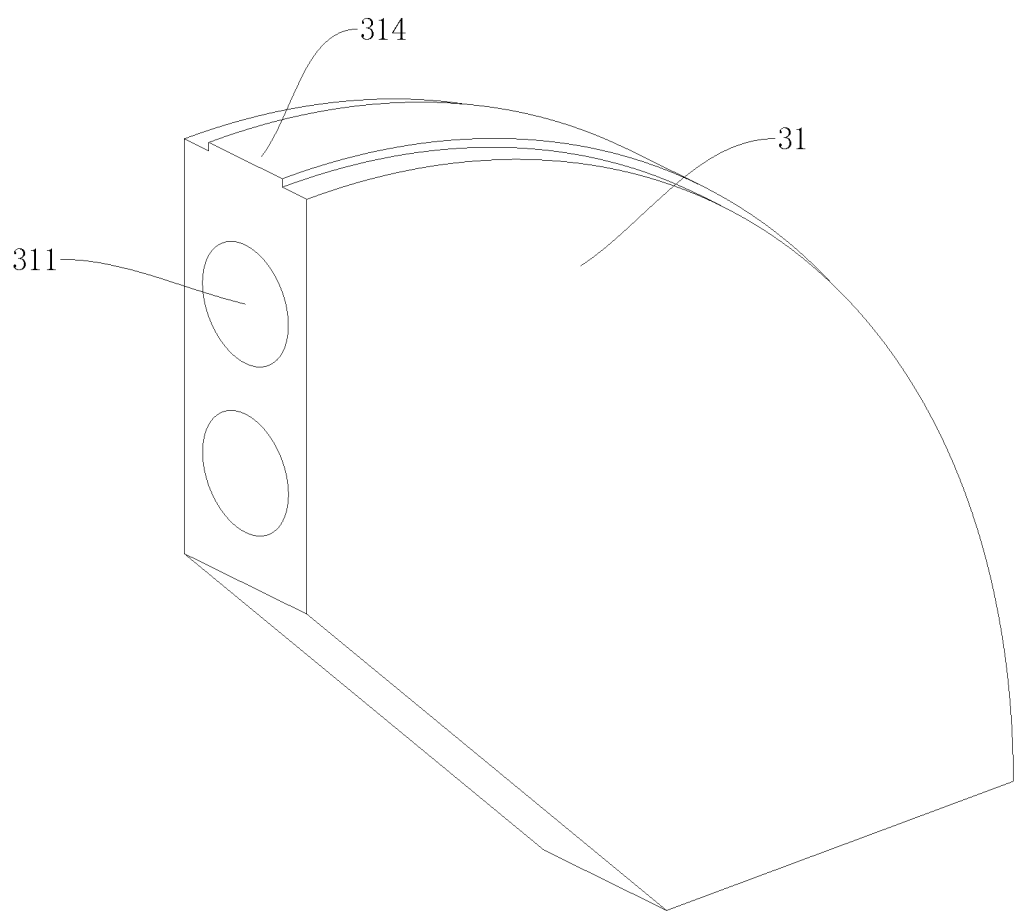
FIG. 13 is a schematic three-dimensional structural diagram of the friction monomer adopted by the brake provided by one embodiment of the present application.
Figure 14:
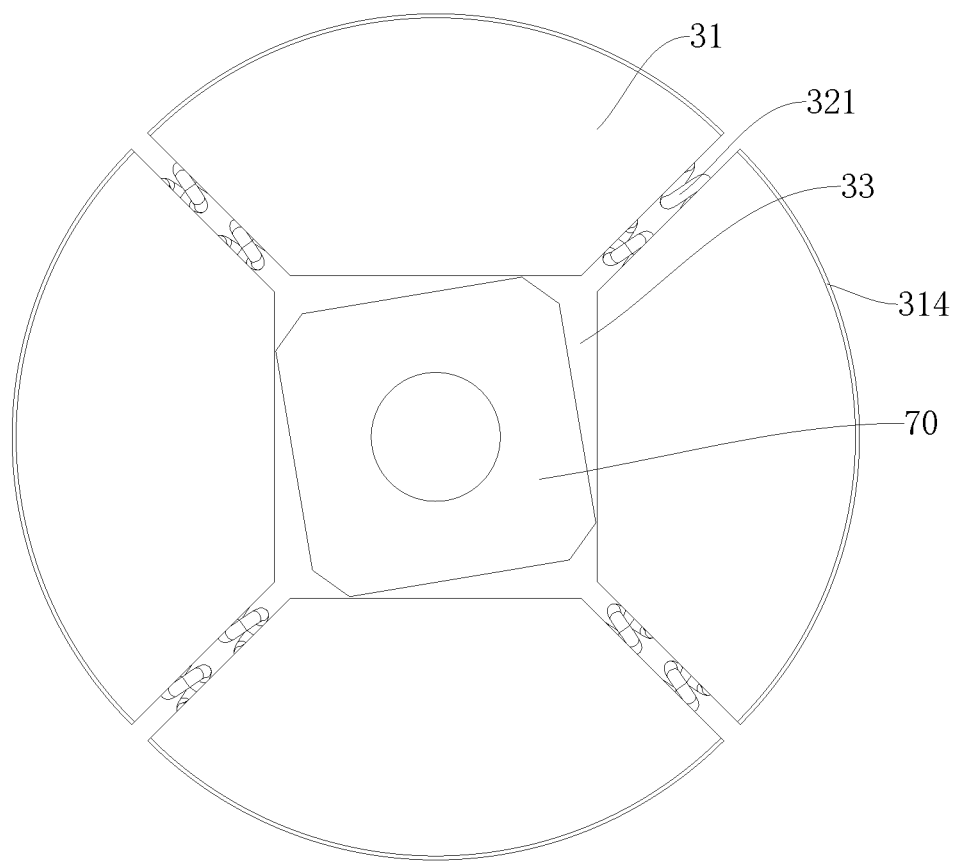
FIG. 14 is a schematic use state diagram of the friction disk adopted by the brake provided by one embodiment of the present application.
Figure 15:
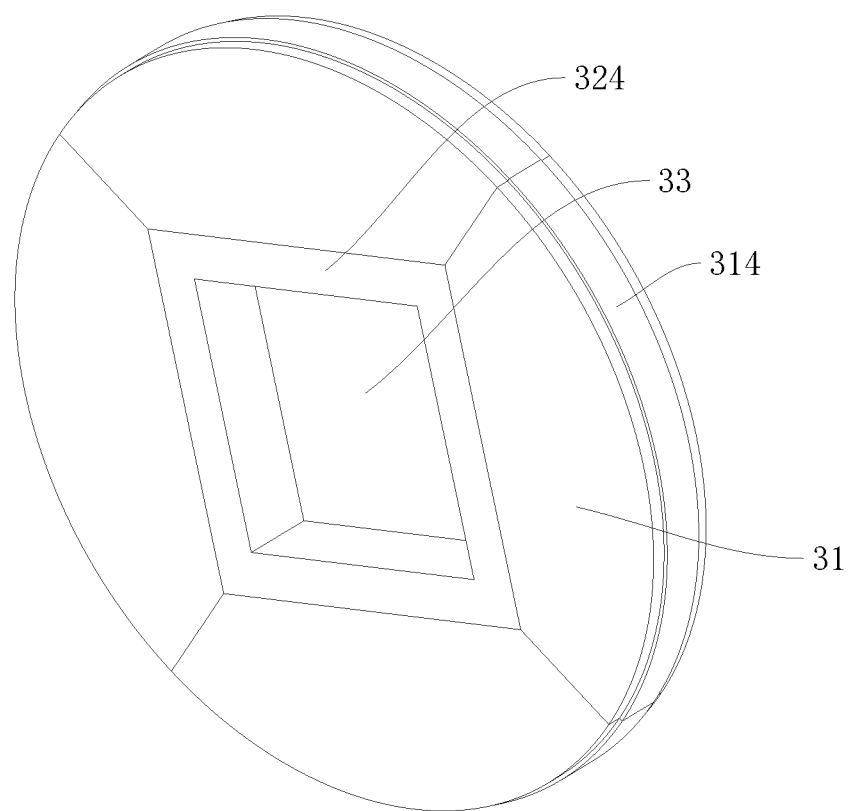
FIG. 15 is a schematic three-dimensional diagram of the friction disk adopted by the brake provided by another one embodiment of the present application.

In some embodiments, a specific embodiment of the elastic component 32 may adopt the structure shown in FIG. 12-FIG. 14. Refer to FIG. 12-FIG. 14, the elastic component 32 includes a plurality of first tension spring groups, and each of the plurality of first tension spring groups is connected between two adjacent friction monomers 31. Each first tension spring group includes at least one first tension spring 321. The central space 33 forms a space for adapting a shaft sleeve. Each first tension spring 321 is fixed between two adjacent friction monomers 31. The number of the first tension springs 321 included in each first tension spring group is unlimited. For example, two adjacent friction monomers 31 may be connected through one first tension spring 321 or two first tension springs 321 (that is, one first tension spring group includes two first tension springs 321). The number of the first tension springs 321 needs to take into account the strength of the structure and the corresponding speed when the friction monomer 31 is separated. The first tension spring 321 is used to connect the adjacent friction monomers 31, so that all the friction monomers 31 form a friction disk 30 as a whole in this embodiment. The overall structure of the friction disk 30 is simple and easy to assemble.

It can be understood that the first tension spring 321 may not protrude from the two end faces of the friction monomer 31 along the axial direction of the magnetic yoke iron core 101, otherwise it will affect the two shaft end surfaces (two side surfaces) of the friction disk 30 to participate in friction as the working surface.

In this embodiment, the two ends of each first tension spring 321 are respectively connected with two adjacent friction monomers 31. The stress analysis of a single friction monomer 31 is carried out, and its two sides are pulled by the first tension spring 321 respectively. The pulling force has two components, one is the radial force pointing to the circle center, and the other is the circumferential force perpendicular to the radial force. For the first tension springs 321 on different sides of the friction monomer 31, their circumferential forces are equal and opposite to each other, offsetting each other. Their radial forces are in the same direction, pointing to the circle center along the radial direction, forming a resultant force to move the friction monomer 31 to the central space 33.

In some embodiments, an improved embodiment of the friction monomer 31 may adopt the structure shown in FIG. 12 and FIG. 13. Refer to FIG. 12 and FIG. 13, the corresponding surface of the friction monomer 31 is provided with a first accommodating groove 311. The corresponding surface is the side of one friction monomer 31 adjacent to the other friction monomer 31, and each friction monomer 10 has two corresponding surfaces. Both ends of each first tension spring 321 are respectively fixedly connected to the two adjacent friction monomers 31, specifically, they are respectively fixed to the groove bottom of the two first accommodating groove 311 whose opening is opposite.

If the first accommodating groove 311 is not set, the first tension spring 321 is between two adjacent friction monomers 31. Even the speed does not exceed the preset value, there is a certain gap between the adjacent friction monomers 31 due to the first tension spring 321. Which is not conducive to the overall stability of friction disk 30. Moreover, in this case, the length of the first tension spring 321 is also greatly limited and may not be too long. With the first accommodating groove 311 set, the first tension spring 321 is in the first accommodating groove 311 when the speed does not exceed the preset value. The adjacent friction monomers 31 may be close to each other through the side, which is conducive to improving the overall stability of the friction disk 30. Moreover, the first tension spring 321 may also choose a longer specification to optimize the effect of applying tension to the friction monomer 31.

In some embodiments, an improved embodiment of the friction monomer 31 may adopt the structure shown in FIG. 11-FIG. 14. Refer to FIG. 11-FIG. 14, the section of the central space 33 is polygonal. When the central space 33 (i.e. the shaft sleeve fitting space, a space for adapting a shaft sleeve) surrounded by the friction monomer 31 is polygonal, the shape of the shaft sleeve 70 may easily fit the central space 33.

When the rotational speed is low, the inner wall of the central space 33 fits with the peripheral side wall of the shaft sleeve 70 (That is, the inner surface of each friction monomer 31 fits with the outer peripheral wall of the shaft sleeve 70). While when the rotational speed is too high, the adjacent friction monomers 31 are separated, so that the central space 33 becomes larger and larger than the outer diameter of the shaft sleeve 70. At this time, the friction monomer 31 is separated from the drive of the shaft sleeve 70, and the rotational speed of the friction disk 30 will be correspondingly reduced compared with the shaft sleeve 70. That is, the shaft sleeve 70 rotates faster, while the speed of the friction disk 30 is slower, and there is a speed difference between the shaft sleeve 70 and the friction disk 30. The speed difference will continue to increase until each edge of the shaft sleeve 70 is correspondingly clamped on each surface of the central space 33 (from a two-dimensional perspective, that is, each vertex of the shaft sleeve 70 is clamped on each edge of the section polygon of the central space 33), and the shaft sleeve 70 is stably clamped with the friction monomer 31 again. At this time, the shaft sleeve 70 can transmit the driving force to the friction monomer 31, so that the friction disk 30 maintains a certain speed, and the friction monomer 31 maintains a state of separation from each other. In this state, the outer arc surface of the friction monomer 31 contacts the inner wall of the first mounting space 11 (i.e. the inner peripheral surface of the magnetic yoke iron core 101), resulting in friction and braking. In some special cases, the shaft sleeve 70 may be clamped with each friction monomer 31 after the speed is reduced, so that the friction monomer 31 cannot be pulled back by the first tension spring 321. At this time, in order to restore the friction monomer 31 to the normal state, the shaft sleeve 70 can be rotated reversely so that the shaft sleeve 70 is no longer clamped with the friction monomer 31, and the friction monomer 31 can be pulled back by the first tension spring 321.

The structure provided in this embodiment can ensure that when the friction disk 30 runs at a high speed and the normal braking function fails, it can provide additional braking force and enhance the reliability of the brake.

For example, one side of the friction monomer 31 close to the central space 33 is a plane, and the side is the surface on which the friction monomer 31 fits with the peripheral side wall of the shaft sleeve 70. The number of friction monomers 31 is greater than or equal to three, and the number of the friction monomers 31 is equal to the number of sides of the section polygon of the central space 33. For example, when the number of friction monomers 31 is four, the section of the central space 33 is quadrilateral.

It should be noted that the section of the central space 33 may be circular in other embodiments. When the section of the central space 33 is circular, the shaft sleeve 70 and the friction disk 30 may be matched and connected through a toothed structure. The shaft sleeve 70 and the friction disk 30 connected by the toothed structure may have a stable matching state, and there is no need to reverse the shaft sleeve 70 when the shaft sleeve 70 is clamped with the friction disk 30 and when the central space 33 is polygonal.

In some embodiments, an alternative embodiment of the elastic component 32 may adopt the structure shown in FIG. 15-FIG. 18. In the above embodiment, the first tension spring group is used to connect each friction monomer 31 as a whole to form a friction disk 30. In this embodiment, the fixed frame 324 and the second tension spring group are used to connect each friction monomer 31 as a whole of the friction disk 30. Refer to FIG. 15-FIG. 18, the elastic component 32 includes a fixed frame 324 and a second tension spring group. The fixed frame 324 is located in the central space 33 and the inside of the fixed frame 324 forms a space for adapting the shaft sleeve. The second tension spring group is connected between the plurality of friction monomers 31 and the fixed frame 324 (i.e. one end of the second tension spring group is connected with the friction monomer 31, and the other end is connected with the fixed frame 324). The second tension spring group includes at least one second tension spring 322. The fixed frame 324 fits with the shaft sleeve 70. When the rotational speed is lower than the preset value, the tensile force of the second tension spring 322 is greater than the centrifugal force received by each friction monomer 31, and one side of the friction monomer 31 close to the central space 33 is attached to the peripheral surface of the fixed frame 324. When the rotational speed is higher than the preset value, the tensile force of the second tension spring 322 is less than the centrifugal force received by each friction monomer 31 and the friction monomer 31 moves away from the central space 33 along the radial direction of the magnetic yoke iron core 101, and one side of the friction monomer 31 close to the central space 33 is separated from the outer peripheral surface of the fixed frame 324. In this way, with the change of the speed of the braked shaft, the friction monomer 31 dynamically approaches or moves away from the central space 33 along the radial direction of the magnetic yoke iron core 101. Moreover, when the friction monomer 31 moves away from the central space 33 along the radial direction of the magnetic yoke iron core 101, the outer diameter of the whole friction disk 30 becomes larger, and the outer circumference of the friction disk 30 contacts the inner wall (i.e. the inner peripheral surface of the magnetic yoke iron core 101) of the first mounting space 11 to generate friction and braking, so as to reduce the speed of the friction disk 30 and the braked shaft.

It should be noted that the fixed frame 324 can also be called an attachment frame. The friction monomer 31 is connected and attached to the attachment frame through the second tension spring 322 to form a friction disk 30.

In this embodiment, the section of the fixed frame 324 may be circular or polygonal. When the section of the fixed frame 324 is circular, the number of the second tension spring group is one, the second tension spring group includes a plurality of the second tension springs 322, the plurality of the second tension springs 322 are evenly distributed around the fixed frame 324. When the section of the fixed frame 324 is polygonal, the number of the second tension spring group is a plurality, a plurality of the second tension spring groups are set one by one corresponding to one side of the fixed frame 324 away from the central space 33. The number of sections of the fixed frame 324 is the same as the number of sides. Moreover, each second tension spring group is located in the middle of the outer side corresponding to the fixed frame 324.

Figure 16:
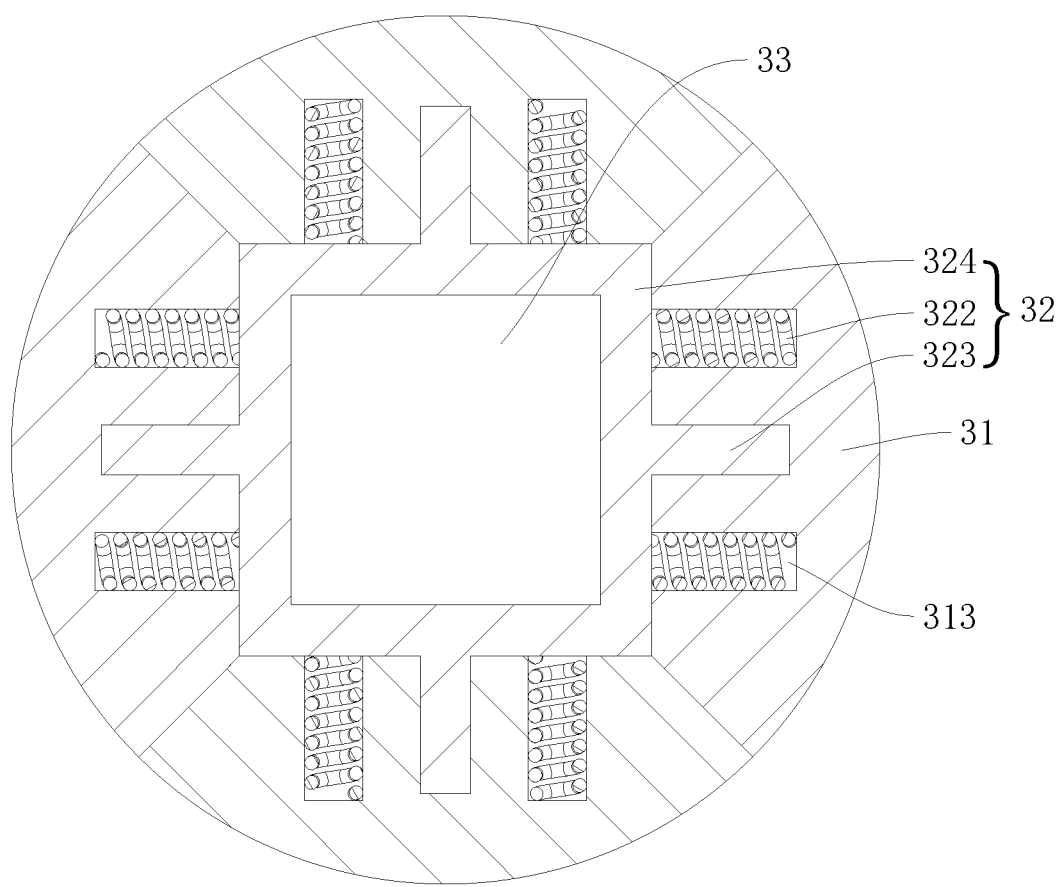
FIG. 16 is a schematic sectional structural diagram of the friction disk adopted by the brake provided by another one embodiment of the present application.
Figure 17:
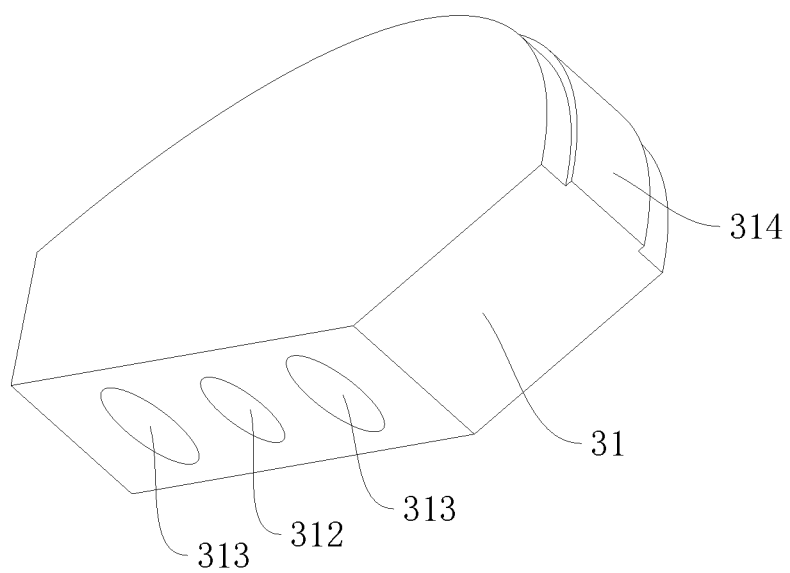
FIG. 17 is a schematic three-dimensional structural diagram of the friction monomer adopted by the brake provided by another one embodiment of the present application.
Figure 18:
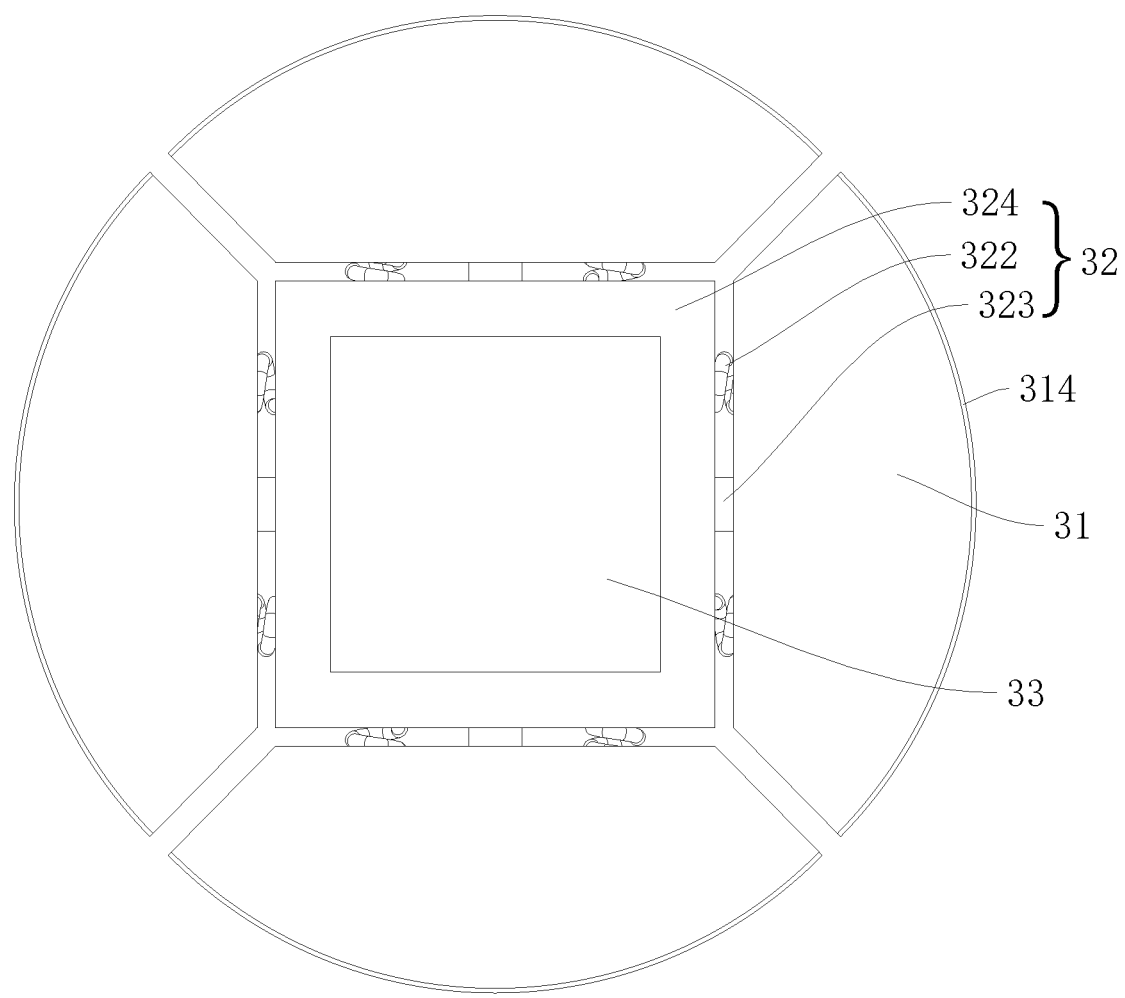
FIG. 18 is a schematic use state diagram of the friction disk adopted by the brake provided by another one embodiment of the present application.

In some embodiments, an improved embodiment of the elastic component 32 may adopt the structure shown in FIG. 16-FIG. 18. Refer to FIG. 16-FIG. 18, the elastic component 32 further includes at least one guide post 323 having an end fixedly connected to the fixed frame 324. Each guide post 323 extends along the radial direction of the magnetic yoke iron core 101, and a chute 312 slidably matched with the guide post 323 is arranged on one side of the friction monomer 31 close to the central space 33. The guide post 323 and the chute 12 correspond one by one. The guide post 323 may guide the movement of the friction monomer 31 to ensure that the friction monomer 31 moves according to the preset path and prevent the movement path of the friction monomer 31 from skewing. This enhances the ability of the friction monomer 31 to withstand interference and ensures that the friction monomer 31 accurately corresponds to the peripheral surface of the fixed frame 324 when it is closed and reset.

For example, the guide post 323 may be a pin sliding with the chute 312. The matching form of the guide post 323 and the chute 312 provided in this embodiment has better effect when the section of the fixed frame 324 is polygonal.

In some embodiments, an improved embodiment of the guide post 323 may adopt the structure shown in FIG. 16-FIG. 18. Refer to FIG. 16-FIG. 18, each guide post 323 is arranged in the middle position of one side of the friction monomer 31 close to the central space 33. The guide post 323 is in the middle position, which is conducive to the stability of the friction monomer 31 when moving along the radial direction of the magnetic yoke iron core 101 and optimizes the guiding effect.

In this embodiment, when the second tension spring group includes a plurality of second tension springs 322, the plurality of second tension springs 322 are equidistantly distributed along the long side of the side of the friction monomer 31. When the number of the second tension springs 322 is even, the number of the second tension springs 322 on both sides of the guide post 323 is the same. When the number of the second tension springs 322 is odd, the difference in the number of the second tension springs 322 on both sides of the guide post 323 is 1; alternatively, the number of the second tension springs 322 on both sides of the guide post 323 is the same, and the second tension spring 322 in the middle is sleeved on the guide post 323. At this time, the second tension spring 322 sleeved on the guide post 323 is located in the chute 312 and shares the chute 312 with the guide post 323.

In some embodiments, an improved embodiment of the installation of the second tension spring 322 may adopt the structure shown in FIG. 16 and FIG. 17. Refer to FIG. 16 and FIG. 17, a second accommodating groove 313 is formed on one side of the friction monomer 31 close to the central space 33. Both ends of the second tension spring 322 are respectively fixedly connected to the groove bottom of the second accommodating groove 313 and the outer peripheral surface of the fixed frame 324. When the rotational speed does not exceed the preset value, the tension of the second tension spring 322 is greater than the centrifugal force of the friction monomer 31, and the friction monomer 31 is close to the fixed frame 324. If without the second accommodating groove 313, the second tension spring 322 is between the friction monomer 31 and the fixed frame 324, and there will be a gap between the friction monomer 31 and the fixed frame 324, and the length of the second tension spring 322 may not be too long. With the second accommodating groove 313 set, the second tension spring 322 is in the second accommodating groove 313 when the speed does not exceed the preset value, which enables the friction monomer 31 to cling to the fixed frame 324 and improves the overall stability of the friction disk 30. Moreover, the second tension spring 322 may also choose a longer specification to optimize the effect of reciprocating movement of the friction monomer 31.

In some embodiments, an improved embodiment of the friction monomer 31 may adopt the structure shown in FIG. 11-FIG. 18. Refer to FIG. 11-FIG. 18, a boss 314 is arranged on one side of each the friction monomer 31 away from the central space 33. The requirements for the thickness of the friction disk 30 and the flatness of the two surfaces are very high. If the boss 314 is not set, when overspeed braking occurs (that is, when the rotational speed exceeds the preset value, the friction monomer 31 is far away from the central space 33, and the outer peripheral surface of the friction disk 30 rubs with the inner wall of the magnetic yoke iron core 101), the outer edge of the friction disk 30 will be worn, which may affect the flatness of the two side surfaces of the friction disk 30, the radius and the thickness of the outer ring of the friction disk 30, and then affect the braking effect. When the friction monomer 31 moves away from the central space 33, the boss 314 on the outer circumference of the friction monomer 31 first contacts the inner wall (i.e. the inner peripheral surface of the magnetic yoke iron core 101) of the first mounting space 11 due to the boss 314 provided. In this way, the boss 314 is preferentially worn, and the flatness of the surface on both sides of the friction disk 30, the radius and the thickness of the outer ring of the friction disk 30 are not affected, so as to maintain a good braking effect.

The above-mentioned embodiments are only used to illustrate the technical solutions of the disclosure, but not to limit the disclosure. However, these modifications or replacements do not make the essence of the corresponding technical solutions deviate from the spirit and scope of the technical solutions of the embodiments of the present application, and should be included within the protection scope of the present application.

What is claimed is:

1. A brake comprising:
a magnetic yoke iron core comprising a first mounting space and a second mounting space distributed sequentially and concentrically from inside to outside of the magnetic yoke iron core, the first mounting space penetrating through a center position of the magnetic yoke iron core in an axial direction of the magnetic yoke iron core, and an opening of the second mounting space facing a second shaft end of the magnetic yoke iron core;
a first movable plate located in the first mounting space and closer to a first shaft end of the magnetic yoke iron core than to the second shaft end, the first shaft end being an opposite end of the second shaft end;
a plurality of friction disks sequentially arranged in the first mounting space along the axial direction of the magnetic yoke iron core and located at a side of the first movable plate facing the second shaft end;
at least one second movable plate each arranged between two adjacent friction disks;
a coil arranged in the second mounting space;
an armature located at the second shaft end of the magnetic yoke iron core, the armature being connected with the first movable plate through at least one connector, the at least one connector passing through the magnetic yoke iron core and being slidably matched with the magnetic yoke iron core, and the at least one second movable plate being connected with the at least one connector; and
an elastic part arranged between the armature and the magnetic yoke iron core, the elastic part having a pre-tightening force that enables the armature to be far away from the magnetic yoke iron core.

2. The brake according to claim 1, wherein each one of the at least one connector comprises a guide pole and two connecting parts; and the guide pole passes through the magnetic yoke iron core, one end of the guide pole is connected to the first movable plate through one of the two connecting parts, the other end of the guide pole is connected to the armature through the other one of the two connecting parts, and the at least one second movable plate is slidably connected to the guide pole.

3. The brake according to claim 1, further comprising at least one positioning slot formed on an end surface of the first shaft end of the magnetic yoke iron core, the at least one positioning slot being connected to the first mounting space, and the at least one connector correspondingly passing through the at least one positioning slot; and
wherein an outer circumference of the first movable plate and the at least one second movable plate are respectively provided with at least one locating block corresponding to the at least one positioning slot, the at least one positioning slot being configured to avoid the at least one locating block, and the at least one connector being connected to the at least one locating block.

4. The brake according to claim 1, further comprising an annular mounting area for mounting the at least one connector formed on the magnetic yoke iron core, the annular mounting area being between the first mounting space and the second mounting space; and
wherein the annular mounting area is provided with at least one mounting hole, and the at least one mounting hole is arranged alternately with the at least one connector.

5. The brake according to claim 1, wherein an inner side surface of the first mounting space closer to the second shaft end than to the first shaft end is provided with an extending portion extending towards an axis of the magnetic yoke iron core, and an inner diameter of the extending portion is less than an outer diameter of each of the plurality of friction disks.

6. The brake according to claim 1, wherein each of the plurality of friction disks comprises an elastic component and a plurality of friction monomers; and
the plurality of friction monomers are distributed in an annular array around an axis of the magnetic yoke iron core and enclosed to form a central space, each of the plurality of friction monomers being movable towards or away from the central space along a radial direction of the magnetic yoke iron core, the elastic component being connected with the plurality of friction monomers, respectively, and the elastic component being configured with a pre-tightening force to pull the plurality of friction monomers toward the central space.

7. The brake according to claim 6, wherein the elastic component comprises a plurality of first tension spring groups, each of the plurality of first tension spring groups being connected between two adjacent friction monomers, each of the plurality of first tension spring groups comprising at least one first tension spring, and the central space forming a space for adapting a shaft sleeve.

8. The brake according to claim 6, wherein the elastic component comprises:
a fixed frame located in the central space, the fixed frame forming a space within for adapting a shaft sleeve; and
a second tension spring group connected between the plurality of friction monomers and the fixed frame, the second tension spring group comprising at least one second tension spring.

9. The brake according to claim 8, wherein the elastic component further comprises at least one guide post having an end fixedly connected to the fixed frame; and the at least one guide post extends along the radial direction of the magnetic yoke iron core, and a chute slidably matched with the at least one guide post is arranged on one side of at least one friction monomer facing the central space.

10. The brake according to claim 6, further comprising a boss arranged on one side of each of the plurality of friction monomers away from the central space.

11. The brake according to claim 1, wherein the magnetic yoke iron core is provided with a wiring opening in communication with the second mounting space.

12. The brake according to claim 1, wherein the magnetic yoke iron core comprises an iron core body with a preset thickness, the iron core body comprising the first mounting space and the second mounting space that are distributed sequentially and concentrically from inside to outside of the iron core body, and the iron core body having the first shaft end and the second shaft end opposite to each other.

* * * * *